United States Patent
Kleinert

(12) 
(10) Patent No.: US 6,681,520 B1
(45) Date of Patent: *Jan. 27, 2004

(54) SINGLE FASTENER PLANT SUPPORT RING FOR USE WITH A T-SHAPED OR U-SHAPED UPRIGHT POST

(76) Inventor: R. Amil Kleinert, 6921 Stacy Rd., Charlestown, IN (US) 47111

( * ) Notice: Subject to any disclaimer, the term of this patent is extended or adjusted under 35 U.S.C. 154(b) by 0 days.

This patent is subject to a terminal disclaimer.

(21) Appl. No.: 10/069,154

(22) PCT Filed: Aug. 24, 2000

(86) PCT No.: PCT/US00/23480

§ 371 (c)(1),
(2), (4) Date: Feb. 21, 2002

(87) PCT Pub. No.: WO01/13703

PCT Pub. Date: Mar. 1, 2001

Related U.S. Application Data

(63) Continuation of application No. 09/505,114, filed on Feb. 16, 2000, now Pat. No. 6,401,385.
(60) Provisional application No. 60/150,892, filed on Aug. 26, 1999, and provisional application No. 60/167,281, filed on Nov. 24, 1999.

(51) Int. Cl.[7] .......................... A01G 17/06; A01G 17/14
(52) U.S. Cl. .............................. 47/45; 47/47
(58) Field of Search .................. 47/40.5, 41.14, 47/44, 45, 46, 42, 47, 26, 28.1, 29, 70; 248/315, 218.4, 224.8; 24/453, 459, 555

(56) References Cited

U.S. PATENT DOCUMENTS

| | | | | | |
|---|---|---|---|---|---|
| 4,519,162 A | * | 5/1985 | Stuckey | .......................... | 47/47 |
| 4,520,590 A | * | 6/1985 | Schub | .......................... | 47/44 |
| 4,677,788 A | * | 7/1987 | Mastandrea | .................... | 47/47 |
| 4,887,812 A | * | 12/1989 | Moormann | .............. | 248/224.8 |
| 4,922,654 A | * | 5/1990 | Hawke | .......................... | 47/47 |
| 5,341,593 A | * | 8/1994 | Foreman | ........................ | 47/47 |
| 5,395,081 A | * | 3/1995 | Vollink | .................... | 248/218.4 |
| 5,440,834 A | * | 8/1995 | Kleinart | ........................ | 47/47 |
| 5,595,019 A | * | 1/1997 | Foreman | ........................ | 47/47 |
| 6,378,175 B1 | * | 4/2002 | Vanderpan | .................... | 247/44 |

* cited by examiner

*Primary Examiner*—Charles T. Jordan
*Assistant Examiner*—Elizabeth Shaw
(74) *Attorney, Agent, or Firm*—James E. Cole; Middleton Reutlinger

(57) ABSTRACT

The present invention is a plant support (10) that can be used on either a T-shaped post or a U-shaped post. The support includes a ring (12) for supporting the plant and a latching section which engages the post. The height of the support on the post can be easily altered if the user so desires. The support ring may further include a removable arc (370) section to allow the support ring to be easily removed from around the plant.

23 Claims, 24 Drawing Sheets

SINGLE FASTENER PLANT SUPPORT RING FOR USE WITH A T-SHAPED OR U-SHAPED UPRIGHT POST

CROSS-REFERENCE TO RELATED APPLICATIONS

This application claims priority from U.S. Provisional Application Serial No. 60/150,892, filed Aug. 26, 1999, which application is incorporated herein by reference in its entirety, and from U.S. Provisional Application Ser. No. 60/167,281, filed Nov. 24, 1999, which application is incorporated herein by reference in its entirety, and is a continuation from application Ser. No. 09/505,114 now U.S. Pat. No. 6,401,385.

BACKGROUND

This invention relates to a plant support and, more particularly, to a plant support ring for use with either a T-shaped stake commonly employed for electrical fence wiring, or with a U-shaped stake commonly used with residential wire fencing.

Supports or standards for plants, such as tomato plants and young trees, come in all sizes and shapes. Many of these supports include a ring that encircles the main stem or trunk of the plant, and a means for attaching the ring to a stake or post. One common design is a metal ring that attaches to a dowel-type post, such as illustrated in U.S. Pat. No. 730,779, issued to Lacy; U.S. Pat. No. 2,851,823, issued to Peterson; and U.S. Pat. No. 4,534,129, issued to Stuckey. The plant support ring can also be attached to a post specifically designed to support a particular type of ring. Some examples of these plant support rings are described in U.S. Pat. No. 726,631, issued to Broxey; U.S. Pat. No. 4,677,788, issued to Mastandrea; and U.S. Pat. No. 5,341,593, issued to Foreman.

Because the plant may continue to need support as it grows taller, some of the plant supports include a series of rings that expand in size to accommodate the growing plant, such as described in U.S. Pat. No. 5,595,019 issued to Foreman. Other supports allow for one or more rings to be mounted on a post and then repositioned along the post as the plant grows, such as described in U.S. Pat. No. 1,377,832, issued to Hanner; U.S. Pat. No. 3,731,429, issued to Orthman; and U.S. Pat. No. 4,519,162, issued to Stuckey. For example, the Hanner '832 patent describes a plant support in which a V-shaped stake, having a series of spaced-apart holes, provides a support for a wire ring. The ring includes a wire hook that extends through one of the holes in the stake to hold the ring at the desired height, and wire "ears" that loosely envelop the stake. The ring of the '832 patent can be moved to another hole in the stake by disengaging the hook from the hole and moving the ring along the stake. In one embodiment, the diameter of the ring can be enlarged through disengagement of the otherwise hooked ends of the ring, allowing the ring to expand and accommodate large plants.

The Orthman '429 patent describes a plurality of concentric rings that are fixed to a bracket that is removably secured to a post having a T-shaped cross section and shoulders on the outer face of the T-post. The bracket is a channel shaped member with holes along one face. The channel engages a part of the T-post, and the holes register with the shoulders of the T-post to retain the device at the desired vertical position. The height of the rings is adjusted by tilting the bracket so the shoulders exit the holes, and then sliding the channel along the post. There appears to be no positive fastening of the device to the center post.

The Stuckey '162 patent describes a plant support ring that mounts on a U-shaped post. The ring includes a brace member, that engages the flanges of the post, and a locking clip, that includes prongs which fit within apertures of the U-post to hold the brace member at the desired height. The ring can be repositioned on the post by disengaging and repositioning the locking clip.

As noted in U.S. Pat. No. 5,440,834, issued to the present applicant and incorporated herein by reference, the older design plant supports are acceptable for the small residential plant grower, but growers with larger numbers of plants need a ring that can mount on a stronger commercial T-shaped post and be stable on the post. Thus, the support of the '834 patent was designed for use with an upright support having a T-shaped cross-section, and includes a support ring, integral to a support member, and adapted to be secured to a T-shaped post. However, the ring of the '834 patent, while fitting securely on the T-shaped post commonly employed for electrical fences, did not mount securely on the U-shaped post commonly used for residential wire fences and more commonly available at local hardware stores than the T-shaped post.

Thus, it is an object of the present invention to provide for a plant support that can be mounted on a T-shaped post or a U-shaped post; that is easily fastened to and removed from the post; that is easily adjustable up and down the post between fixed positions; that is light weight and easily fabricated; and that can be used with various types of plants, such as tomato plants and small trees.

SUMMARY

The present invention is a plant support that can be used on either a T-shaped post or a U-shaped post. The support, which is preferably made from a polymeric material, includes a ring for supporting the plant, and a brim with a latching section which engages the post, and holds the ring at a pre-selected height on the post. The support can be easily repositioned on the post if the user so desires. In one embodiment, a spacer is included between the ring and the brim so that the plant can be supported at a short distance away from the post.

The support ring may further include a removable arc section to allow the support ring to be easily removed from around the plant. Tabs that project from the ring can also be optionally included to allow plant stalk supporting accessories to be attached to the ring.

DETAILED DESCRIPTION OF THE INVENTION

Figure 8:
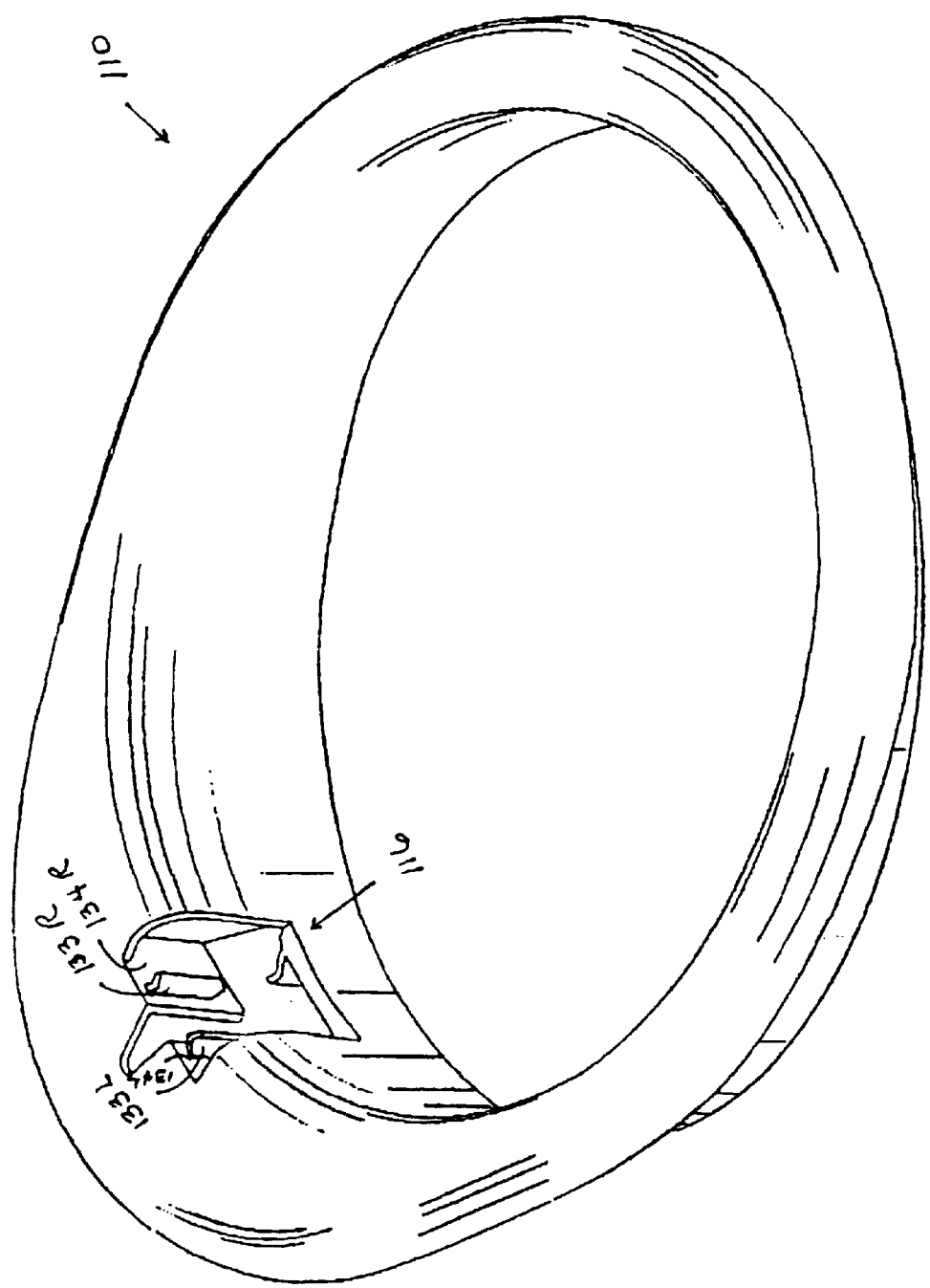
FIG. 8 is a perspective view of a second embodiment of a plant support ring made in accordance with the present invention wherein a second pair of brackets has been added to the latching section.
Figure 9:
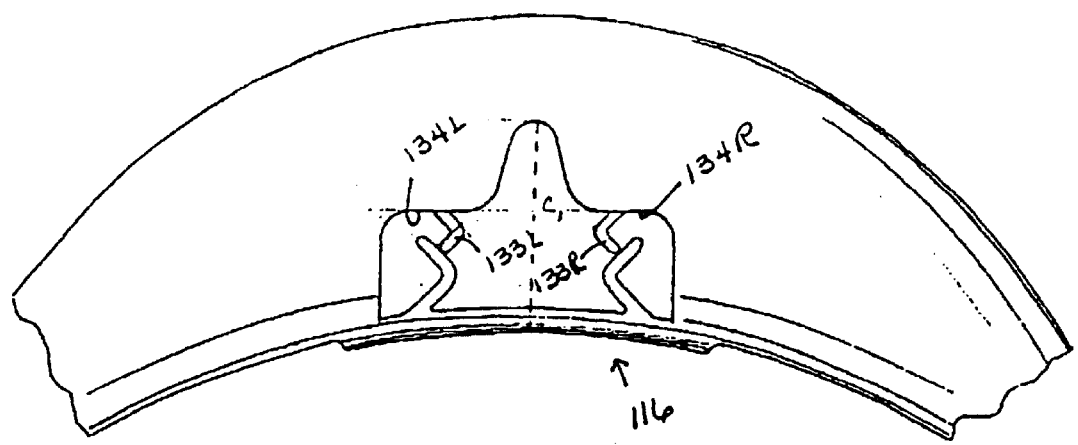
FIG. 9 is a top view of the latching members of the ring of FIG. 8.
Figure 10:
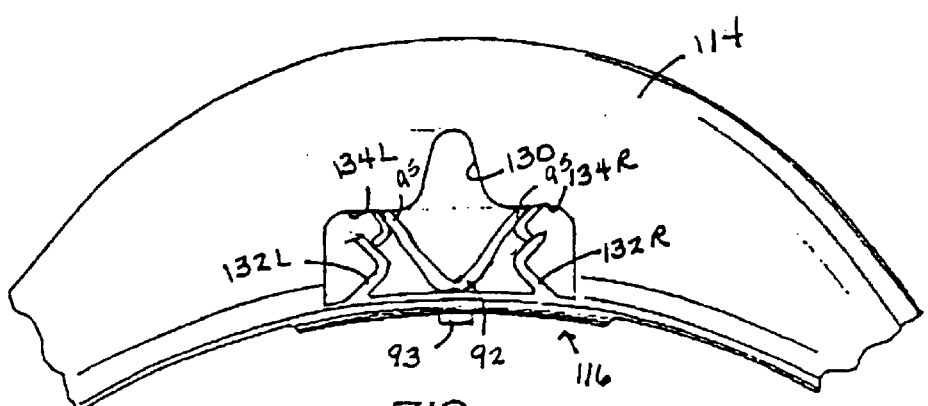
FIG. 10 is a top view of the ring of FIG. 8 attached to a U-shaped post.
Figure 11:
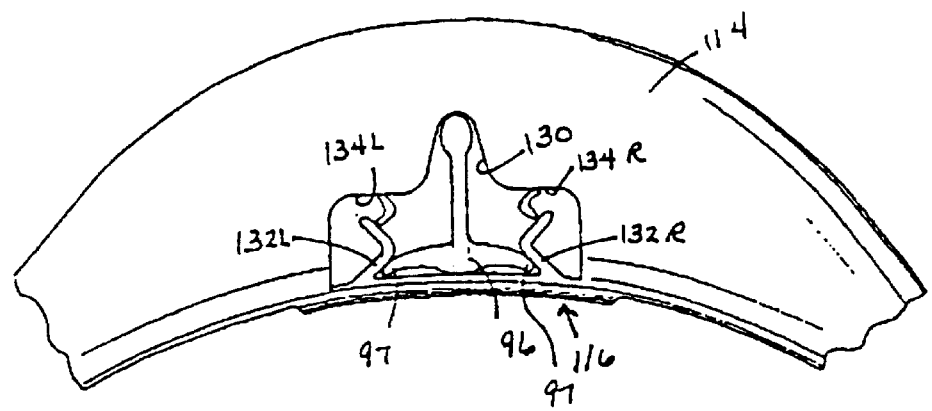
FIG. 11 is a top view of the ring of FIG. 8 attached to a T-shaped post.

The plant support ring depicted in the various Figures is a plastic ring sized to support a common tomato plant, a small tree, or similar garden variety plants. The ring and accompanying components can be increased or decreased in size to support larger plants or smaller plants. The "ring" can also have a variety of shapes, such as a circular shape, oval shape, heart shape, clover shape, elongated shape, "FIG. 8" shape, or other similar shapes. In addition, a support utilizing the inventive features described herein can be used to support non-plant objects, such as electrical wire or wire fencing, that are commonly attached or secured on T-shaped or U-shaped upright posts.

Figure 1:
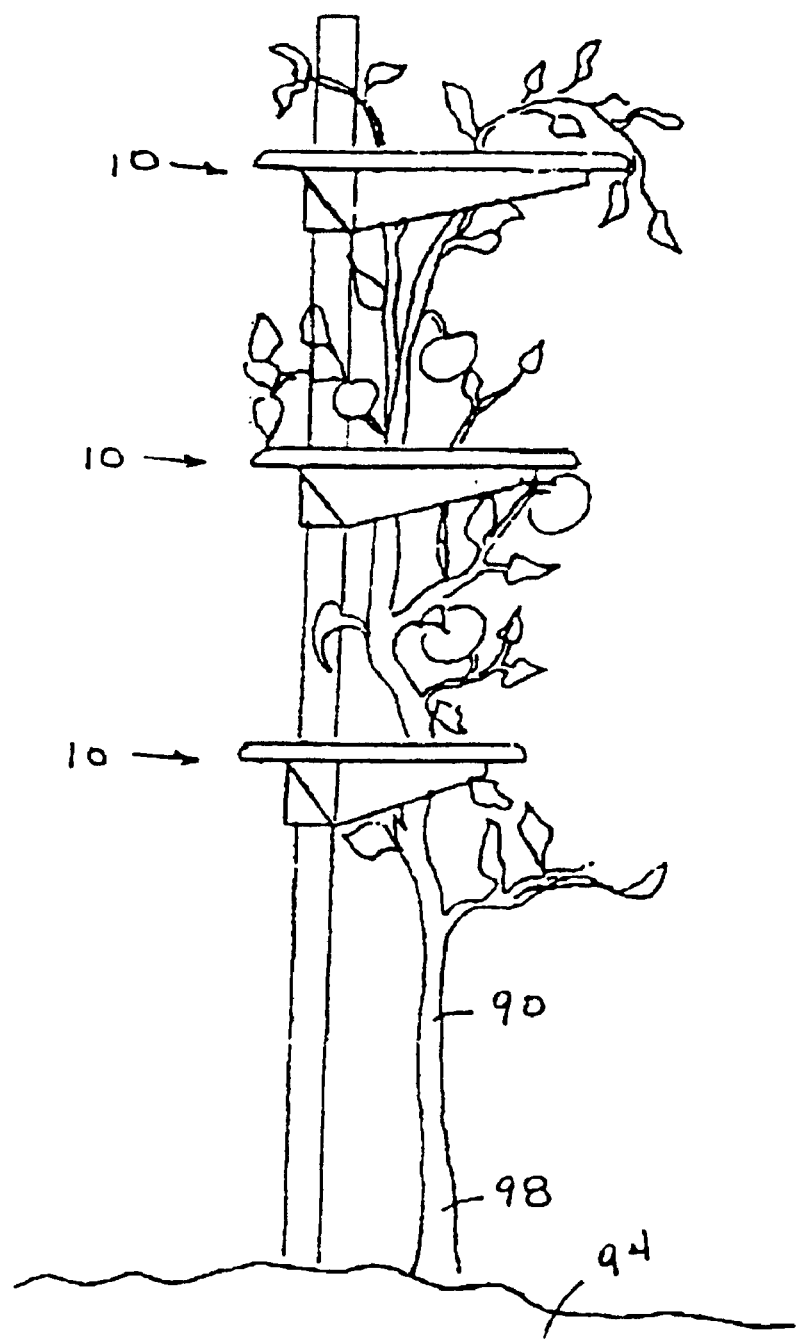
FIG. 1 is a perspective view of a plant support made in accordance with the present invention mounted on a T-shaped post and supporting a tomato plant.

Reference is first made to FIG. 1 which shows a plurality of plant supports 10 made in accordance with the present invention removably mounted on a T-shaped post 96 and supporting a tomato plant 90. The T-shaped post 96 is secured in the ground 94, and at least one plant support 10 is removably mounted on the T-shaped post 96. The support 10 is positioned relative to the tomato plant 90 such that the trunk or main branch 98 of the plant 90 can pass through the support 10. As shown in FIG. 1, a plurality of supports 10 may be attached to a single post 96. The supports 10 can vary in size, as shown, or the supports 10 may be of essentially the same size, depending on the user's need. Further, the plant supports 10 may be attached to a common T-shaped post 96, as shown (a "T-shaped post" being defined as an essentially linear stake with T-shaped cross-section); or to a domestic U-shaped post 92 (a post with a relatively narrow U-shaped cross-section, and which preferably includes small flanges or keys which project from the base of the "U" shape at predetermined positions); or to a foreign U-shaped post 192 (a post with a U-shaped cross-section wherein the "U" is slightly wider than the "U" of the domestic U-shaped post 92, and which preferably includes small flanges or keys which project from the base of the "U" shape at predetermined positions). The posts 92, 96, 192 are most commonly made of metal but a post of any construction may be used provided the post can support the weight of the plant support ring 10.

The plant support 10 is shown in FIGS. 2–7. The support 10 can be made from any material which can maintain its shape when exposed to ambient outdoor conditions. Preferably, the support 10 is made from a polymeric material which can be molded to form the desired shape for the support 10, such as polyethylene, polypropylene, high density linear polyethylene, polyvinyl chloride (PVC), polyethylene terephthalate (PET), amorphous polyethylene terephthalate (APET), high density polyethylene/ethylvinyl acetate (HDPE/EVA) copolymer, glycol-modified polyethylene terephthalate (PETG), or combinations thereof. Optionally, the polymeric material selected may include dyes, colorants, UV inhibitors, other chemical additives that would further stabilize the polymer for outdoor use, or a combination thereof The support is preferably injection molded from the polymeric material, but can be extruded or stamped if these processing methods would be more appropriate for the material selected.

Figure 2:
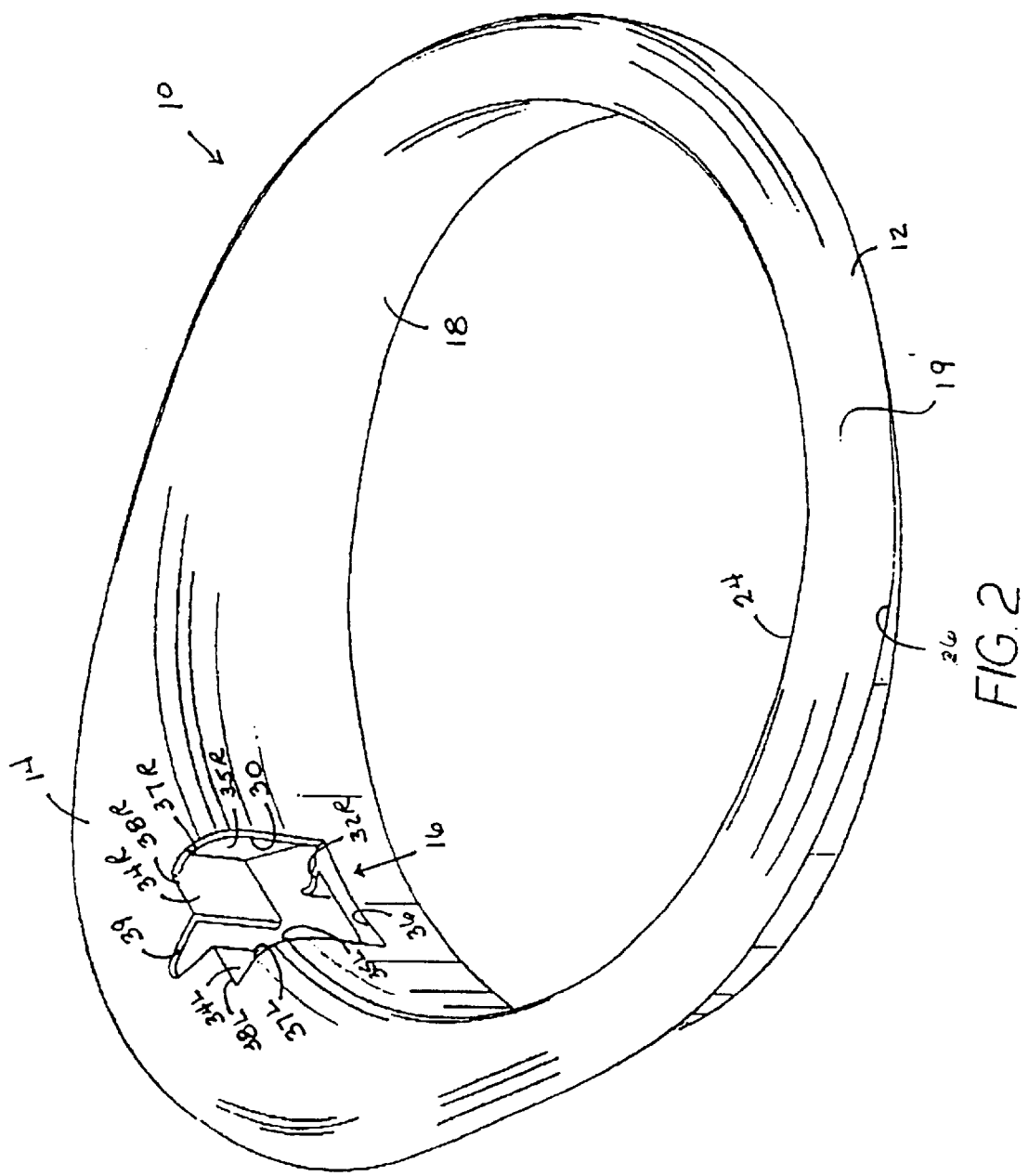
FIG. 2 is a perspective view of the plant support of FIG. 1.
Figure 3:
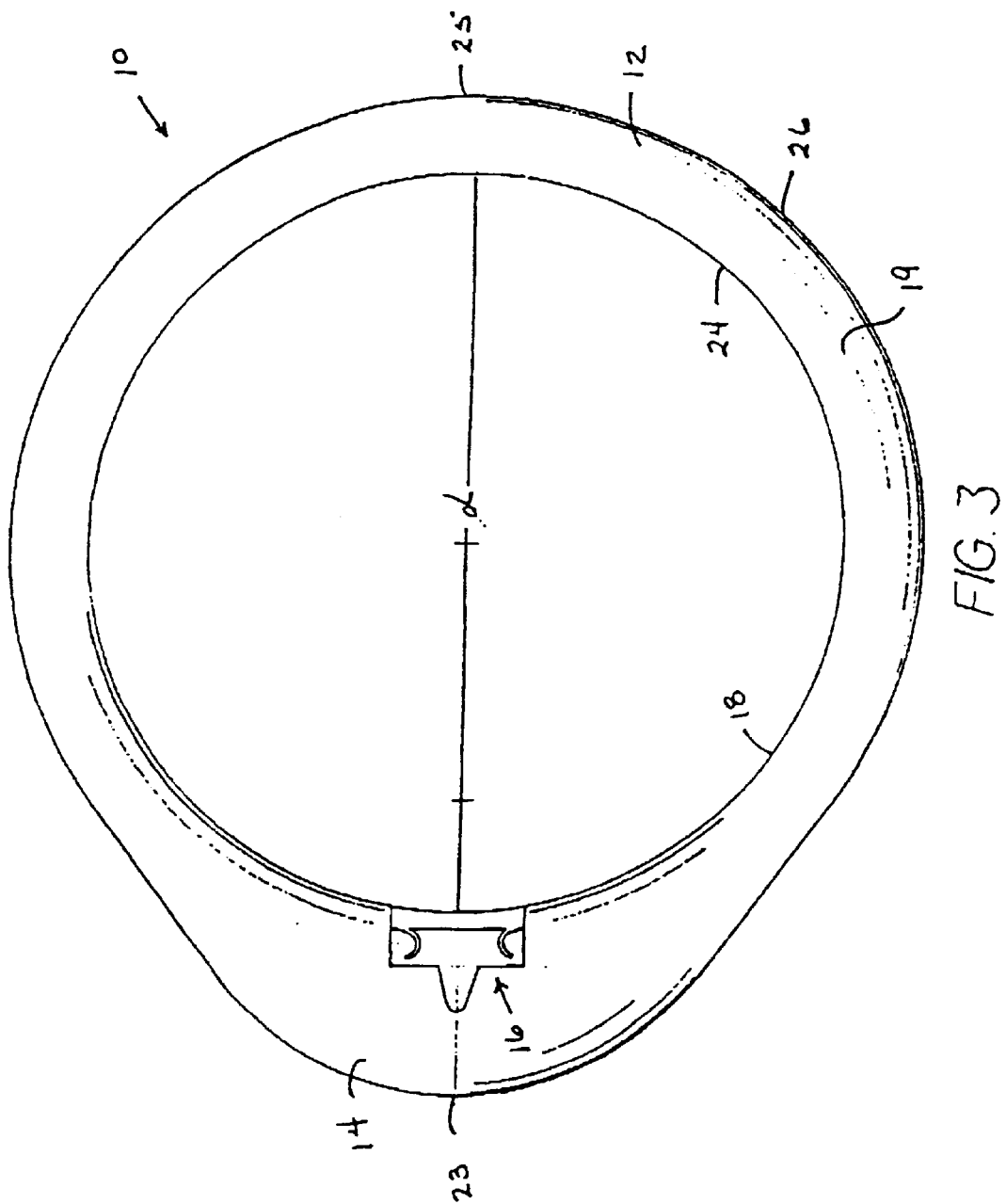
FIG. 3 is a top view of the ring of FIG. 2.
Figure 4:
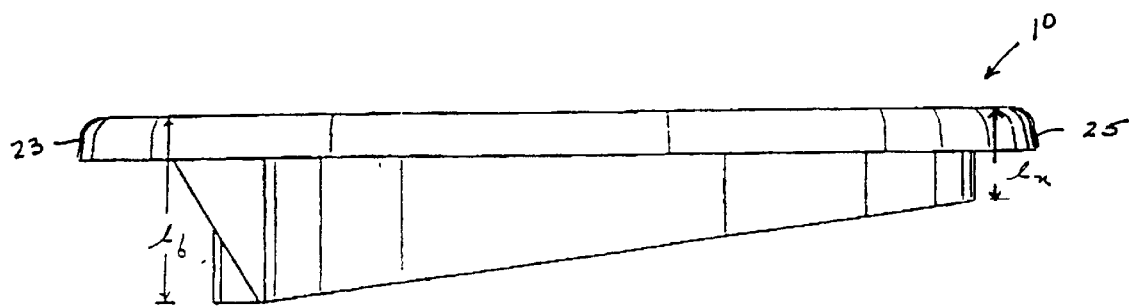
FIG. 4 is side view of the ring of FIG. 2.

The support 10 includes as major components a support ring 12, a brim 14, and a latching section 16. The support ring 12, for supporting the plant 90, may be a single piece unit, as shown in FIGS. 1–7, or it may include a removable arc section (not shown), such as described in U.S. Pat. No. 5,440,834, and incorporated herein by reference. The ring 12, which can have a variety of shapes, such as a circular shape, oval shape, heart shape, clover shape, or other similar shapes, defines an interior lip 24, an exterior lip 26, and a mid-section 19. Referring to FIGS. 2 and 3, the interior lip 24 defines an essentially vertical brace member 18, which has a circular cross-section and a diameter "d" of preferably from about three to about twenty inches, and more preferably from about four to about fourteen inches. As shown in FIG. 4, in the preferred embodiment the brace 18 is tapered so that the length "$l_b$" at the post end 23 is longer than the length "$l_n$" at the protruding end 25. However, the support 10 would function as desired if the length "$l_b$" is essentially equal to the length "$l_n$", or if the length "$l_b$" is shorter than the length "$l_n$". Because the brace member 18 is relatively wide as compared to wire, which is typically used for plant supports, the plant stalks suffer significantly less damage, such as thin cuts in the bark or chafing of the stalk, when the stalk is forced against the brace in a strong wind than is observed when wire plant supports are used, thereby keeping the plant healthier for a longer period of time.

As shown in FIGS. 2 and 3, the exterior lip 26 forms an essentially concentric ring around the brace member 18 near the protruding end 25 of the ring 12, but as the lip 26 extends toward the post end 23 it 26 flares outward forming the essentially horizontal brim 14. The mid-section 19 connects the interior lip 24 to the exterior lip 26. Because the support 10 is intended to be used with plants which commonly have delicate stalks and stems, it is preferred that the mid-section 19 be essentially smooth, that is, that the mid-section 19 have no sharp edges or corners, although this feature is not a requirement for the support 10 generally.

Figure 5:
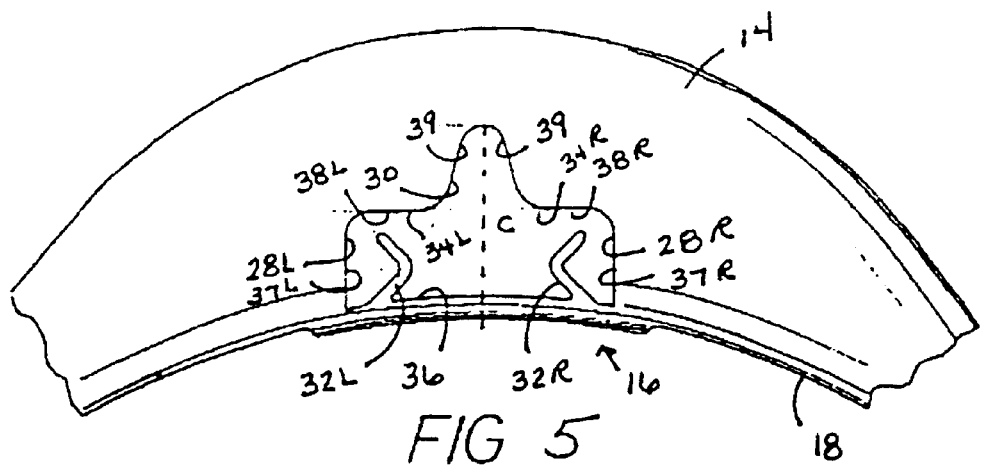
FIG. 5 is an top view of the latching members of the ring of FIG. 2.

As shown in FIGS. 2 and 5, the latching section 16 extends from the brim 14 into the brace 18, and can be divided into a right side 28R and a left side 28L by a centerline "c", wherein the two sides 28R, 28L are essentially mirror images of each other. The latching section 16 includes an irregularly shaped aperture 30 that has a ring edge 36, side edges 37R, 37L, back edges 38R, 38L, and a tail edge 39. A pair of semi-rigid V-shaped brackets 32R, 32L project from the ring edge 36 toward the back edges 38R, 38L, such that the base of each "V" is directed toward the centerline "c". A pair of stops 34R, 34L extend downwardly from the back edges 38R, 38L. In the preferred embodiment, the stops 34R, 34L are approximately the same length as the longer end "$l_b$" of the brace 18. Optionally, the side edges 37R, 37L can include a pair of sidewalls 35R, 35L to strengthen the plant support 10, but the walls 33R, 35L are not necessary for the support 10 to function as intended.

Figure 7:
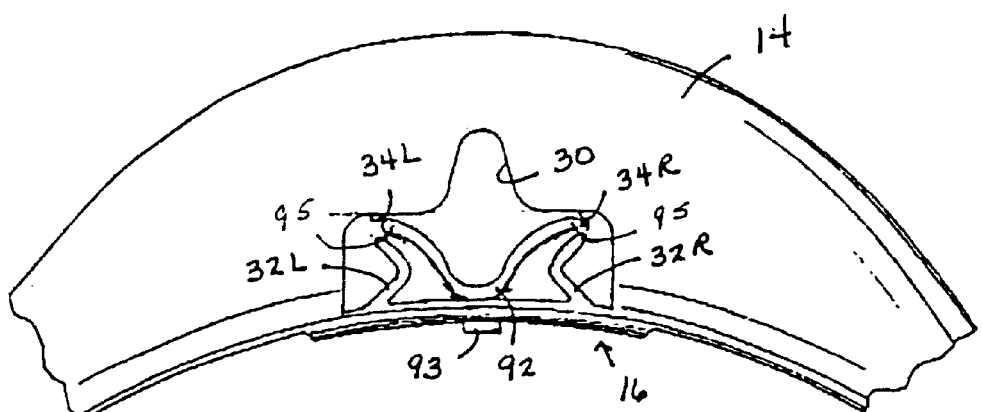
FIG. 7 is a top view of the ring of FIG. 2 attached to a U-shaped post.
Figure 6:
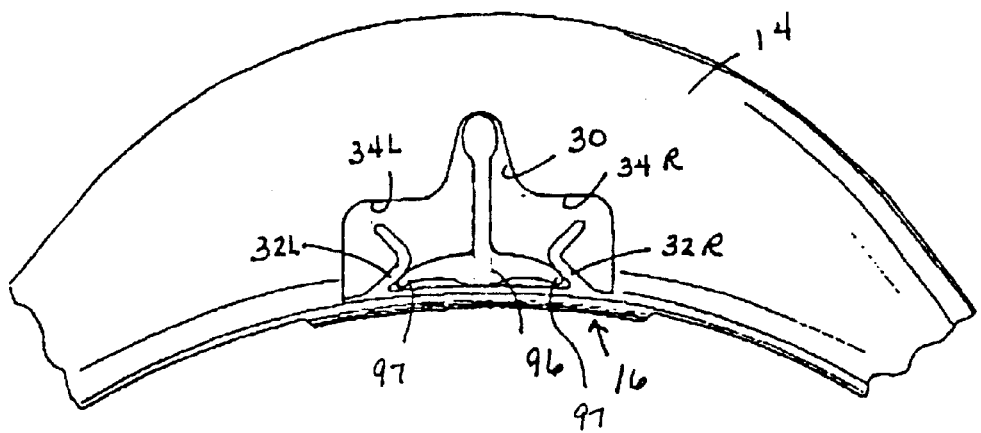
FIG. 6 is a top view of the ring of FIG. 2 attached to a T-shaped post.

As shown in FIGS. 6 and 7, respectively, the aperture 30 should be sized, and the brackets 32R, 32L and stops 34R, 34L positioned such that either a U-shaped post 92 or a T-shaped post 96 can pass through the latching section 16. When a U-shaped post is passed though the aperture 30, as shown in FIG. 6, the support 10 is held in position by a key 93 on the post 92 engaging the brace 18. When a T-shaped post is passed though the aperture 30, as shown in FIG. 7, the support 10 is held in position by brackets 32R, 32L engaging the spaced edges 97 of the post 96. With either post, the brim 14 stabilizes the support 10 on the post 92 or 96, thereby providing greater stability for the plant support ring 12 and the plant.

FIGS. 8–11 show an alternative embodiment 110 of the plant support which is essentially identical to the embodiment 10 of FIGS. 2–8, except that a second pair of V-shaped brackets 133R, 133 L has been added. The brackets 133R, 133 L are secured onto the stops 134R, 134L, respectively, such that the base of each "V" is directed toward the centerline "$c_1$", and such that the brackets are positioned so that they can engage the spaced edges 95 of the U-shaped post 92 when it passes through the aperture 130. The second set of brackets 133R, 133L further stabilize the plant support 110 when it is mounted on the U-shaped post 92, because there is a positive engagement between the post 92 and the latching section 116 of the support 110. The brackets 133R, 133L do not affect engagement of the T-shaped post 96.

Figure 12:
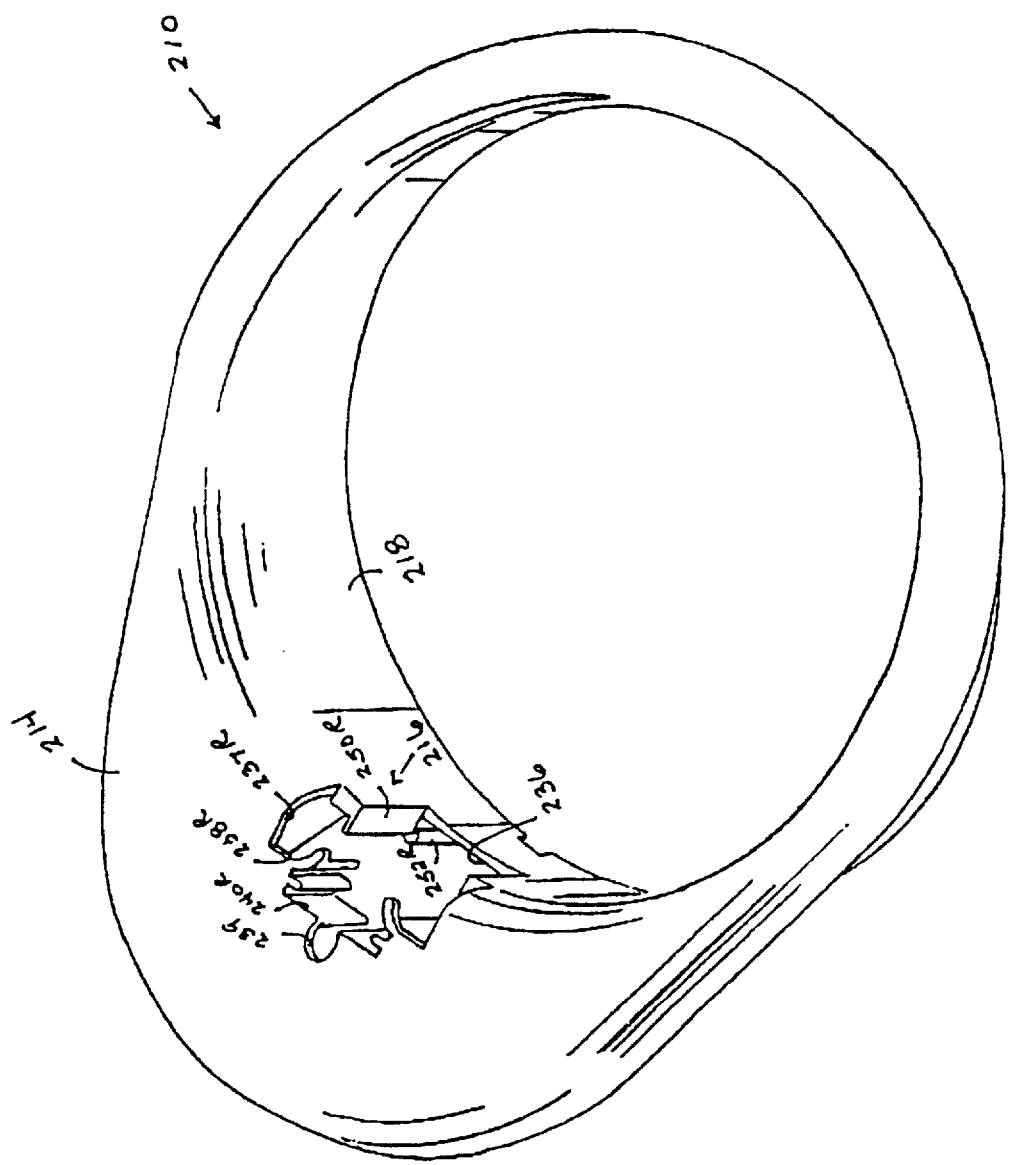
FIG. 12 is a perspective view of a third embodiment of a plant support ring made in accordance with the present invention wherein the latching section has been modified to better accommodate T-shaped posts and alternative U-shaped posts.
Figure 12A:
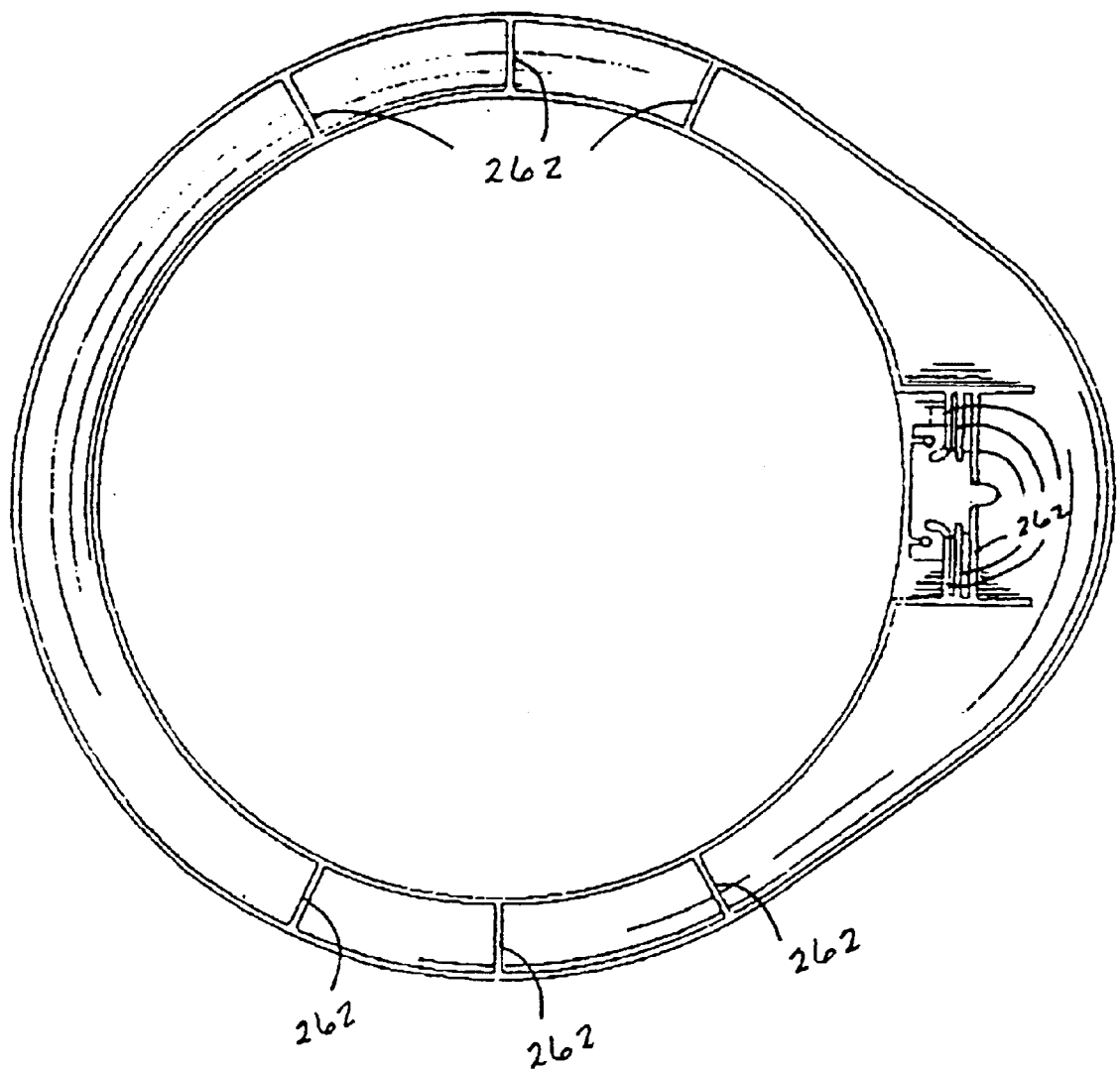
FIG. 12A is a bottom view of the ring of FIG. 12.
Figure 13:
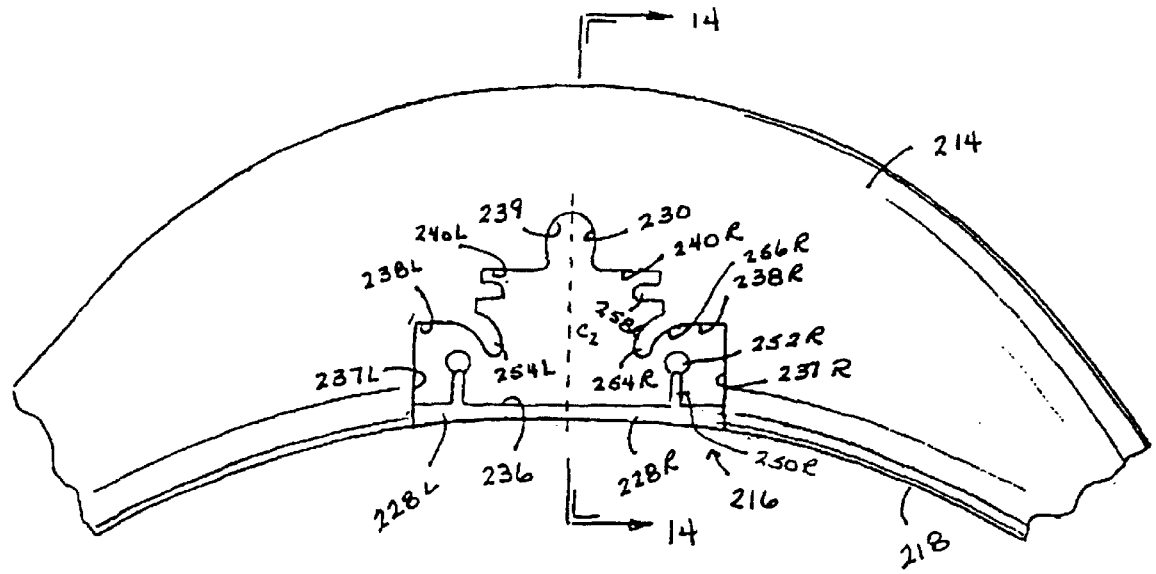
FIG. 13 is a top view of the latching members of the ring of FIG. 11.
Figure 14:
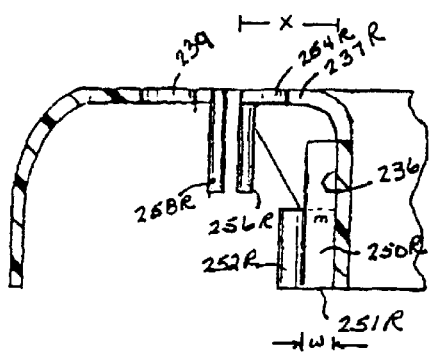
FIG. 14 is a cross-sectional view of the latching section shown in FIG. 13 taken along line 14—14.

FIGS. 12–17 show a second alternative embodiment 210 of the plant support which is similar to the embodiment 10 of FIGS. 2–8, but which includes a latching section 216 designed to better accommodate the T-posts and different types of U-posts. As shown in FIGS. 12–14, the modified latching section 216 extends from the brim 214 into the brace 218, and can be divided into a right side 228R and a left side 228L by a centerline "$c_2$", wherein the two sides 228R, 228L are essentially mirror images of each other, i e., the left side 228L includes components which are essentially mirror images of the components on the right side 228R, and are designated with the letter "L" instead of the letter "R". The latching section 216 includes an irregularly shaped aperture 230 that has a ring edge 236, side edges 237R, 237L, a first pair of back edges 238R, 238L, a second pair of back edges 240R, 240L, and a tail edge 239. Referring to the right side 228R of the latching section 216, a flange 250R, which is essentially parallel to the side edge 237R, projects from the ring edge 236 toward the back edge 238R. The flange 250R has a width "w" that is about one-third the width "x" of the side edge 237R. Attached to the flange 250R is a cylindrical stay 252R which extends from the base 251R to about the midline "m" of the flange 250R (shown in FIG. 14). A thumb 254R attached to a stem 256R projects from the first back edge 238R toward the ring edge 236, and a second stay 258R—which is essentially parallel to the stem 256R—is positioned between the stem 256R and the second rear edge 240R. The left side 228L has an essentially identical flange 250L, cylindrical stay 252L thumb 254L stem 256L, and second stay 258L, in mirror image relationship to the right side 228R. Optionally, ribs 262 may be added to the underside of the support 210, as shown in FIG. 12A, to provide structural strength to the ring 212, and to reinforce the latching section 216.

Figure 15:
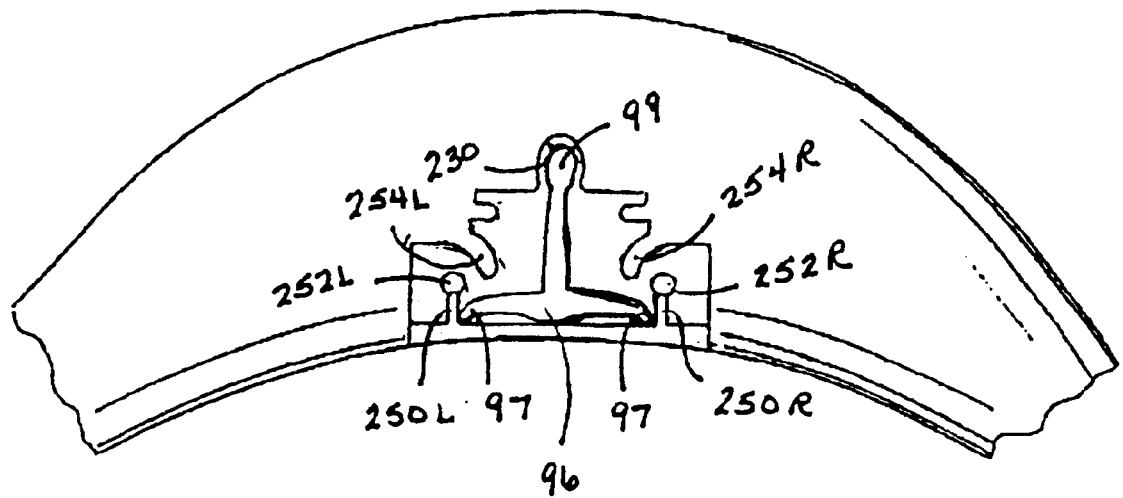
FIG. 15 is a top view of the rind of FIG. 12 attached to a standard T-shaped post.
Figure 17:
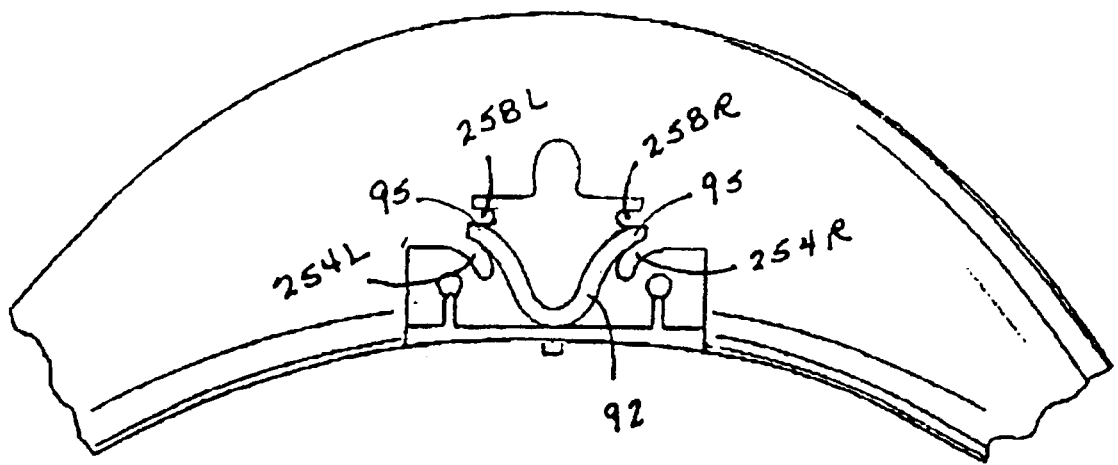
FIG. 17 is a top view of the ring of FIG. 12 attached to a foreign-design U-shaped post.
Figure 16:
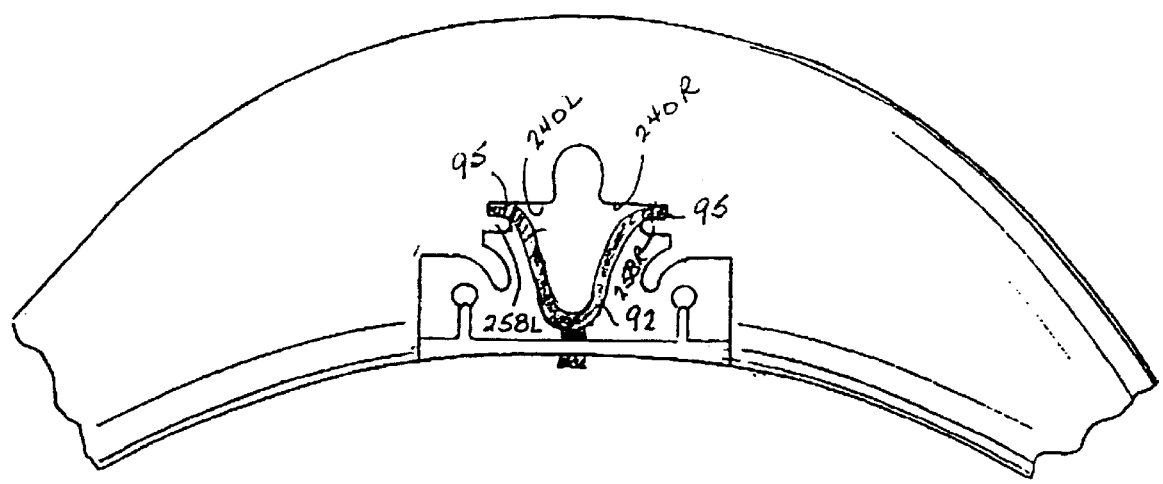
FIG. 16 is a top view of the ring of FIG. 12 attached to a standard domestic U-shaped post.

As shown in FIGS. 15–17, the latching section 216 can better stabilize the T-post 96, and can better engage the spaced edges 95 of the standard domestic U-post 92, and the commercially available foreign-design U-post 192, respectively, than the embodiments 10, 110 shown in FIGS. 1–11. FIG. 15 shows a top view of the support 210 mounted on a T-post 96. The flanges 250R, 250L and stays 252R, 252L serve a similar function as the first set of V-shaped brackets 32R, 32L of the first embodiment 10, i.e. they help engage the spaced edges 97 of the T-post in the latching section 216. But, on the T-post, the support 210 is somewhat constrained by the engagement of the leg of the T-post 99 with the tail edge 230 and by the thumbs 254R, 254L and flanges 250R, 250L surrounding the T-post 96, thus preventing the support 210 from twisting about the T-post 96.

As shown in FIG. 16, second rear edges 240R, 240L, and the stays 258R, 258L can work in combination to align and engage the spaced edges 95 of the domestic U-post 92 within the latching section 216, thereby limiting the mobility of the plant support 210 relative to the U-post 92, and reducing the probability that the support 210 will shift unexpected in a moderate wind or when bumped than would be expected with prior art plant supports. Similarly, as shown in FIG. 17, the thumbs 254R, 254L, and second stays 258R, 258L align and engage the spaced edges 195 of the foreign-design U-post 192 within the latching section 216, thereby limiting the mobility of the plant support 210 relative to the U-post 192.

Figure 18:
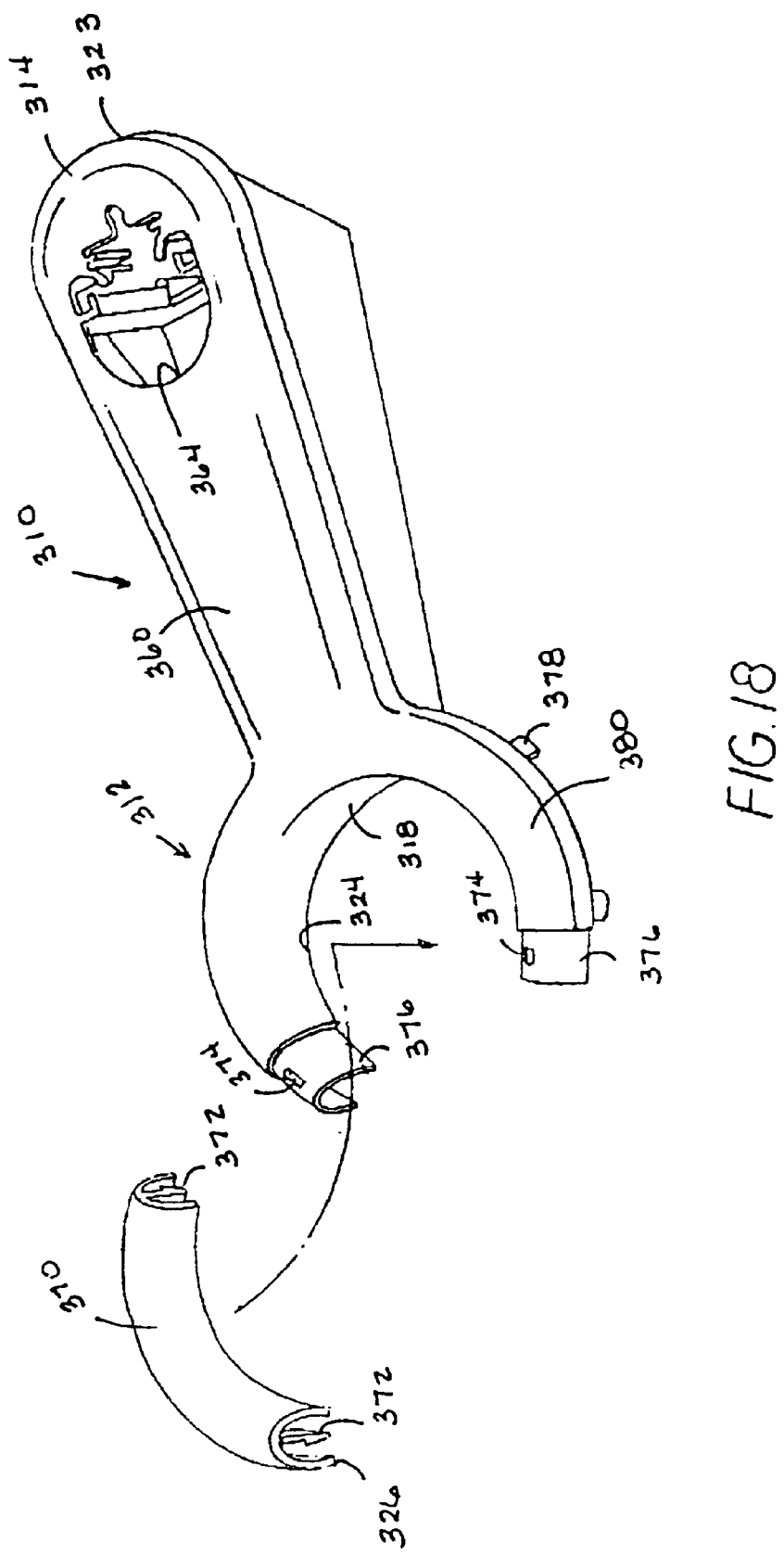
FIG. 18 is a perspective view of a fourth embodiment of a plant support ring made in accordance with the present invention wherein a spacer has been added between the ring and the brim to allow the ring to be held farther away from the post, and showing the removable arc section separated from the ring.
Figure 19:
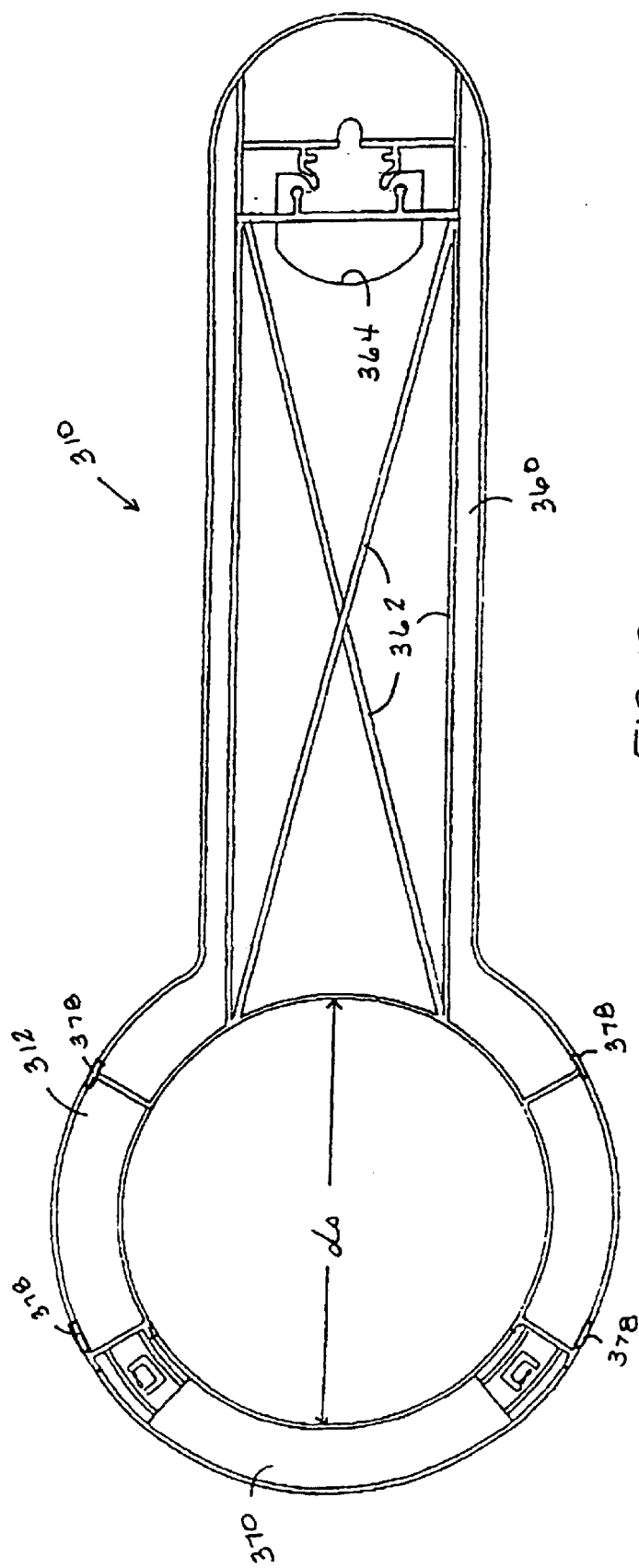
FIG. 19 is bottom view of the ring of FIG. 18.

FIGS. 18 and 19 show a third alternative embodiment 310 which is similar to the embodiment 10 of FIGS. 1–8 except that the ring 312 includes a removable arc segment 370 and small tabs 378 at predetermined positions along the periphery of the ring 312, and the ring 312 is separated from the brim 314 by a spacer 360. Although these modifications are shown within a single alternative embodiment 310, each variation can be used independent of the other variations, or the variations may be used in any desired combination.

Figure 20:
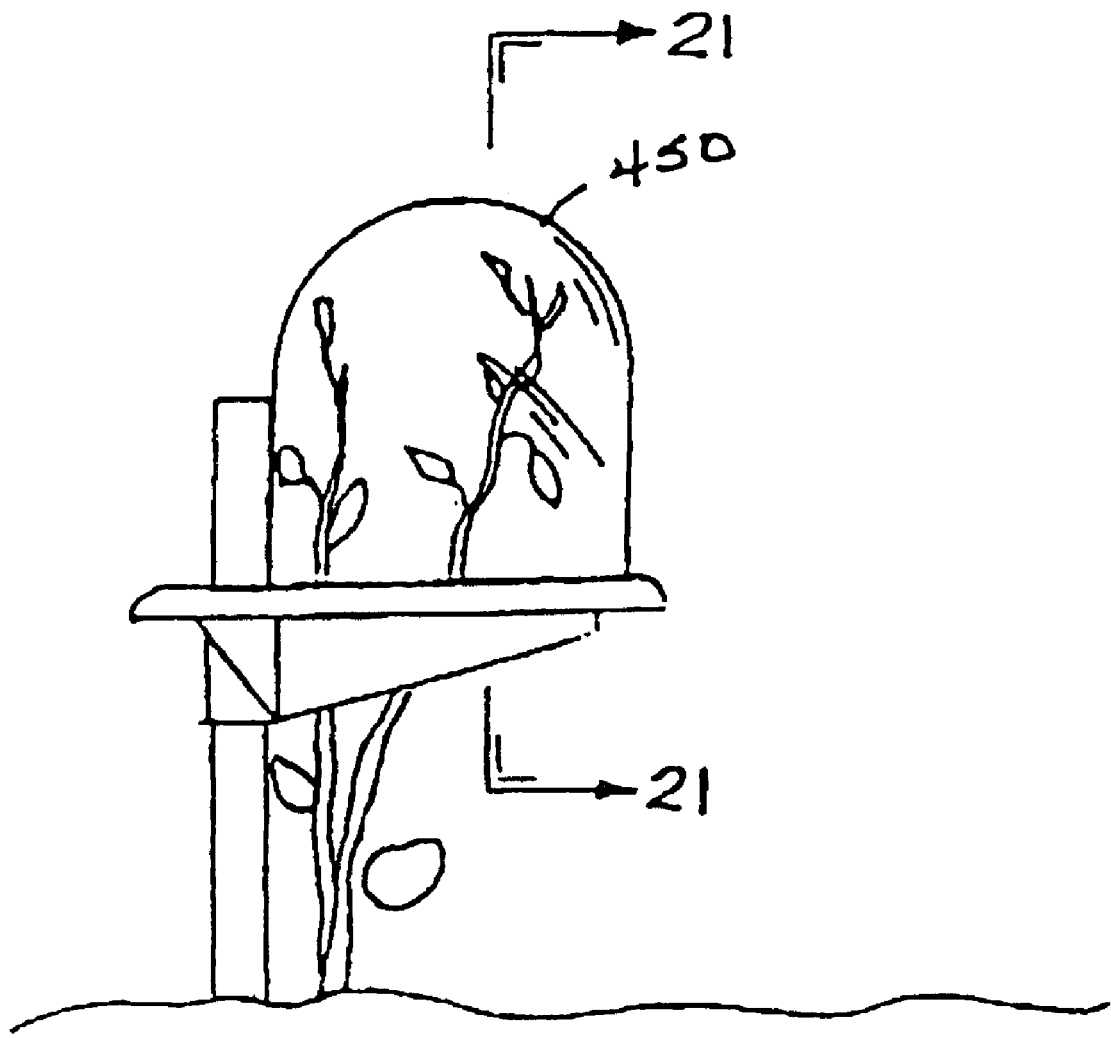
FIG. 20 is a perspective view of the plant support of FIG. 1 further including a frost dome.
Figure 21:
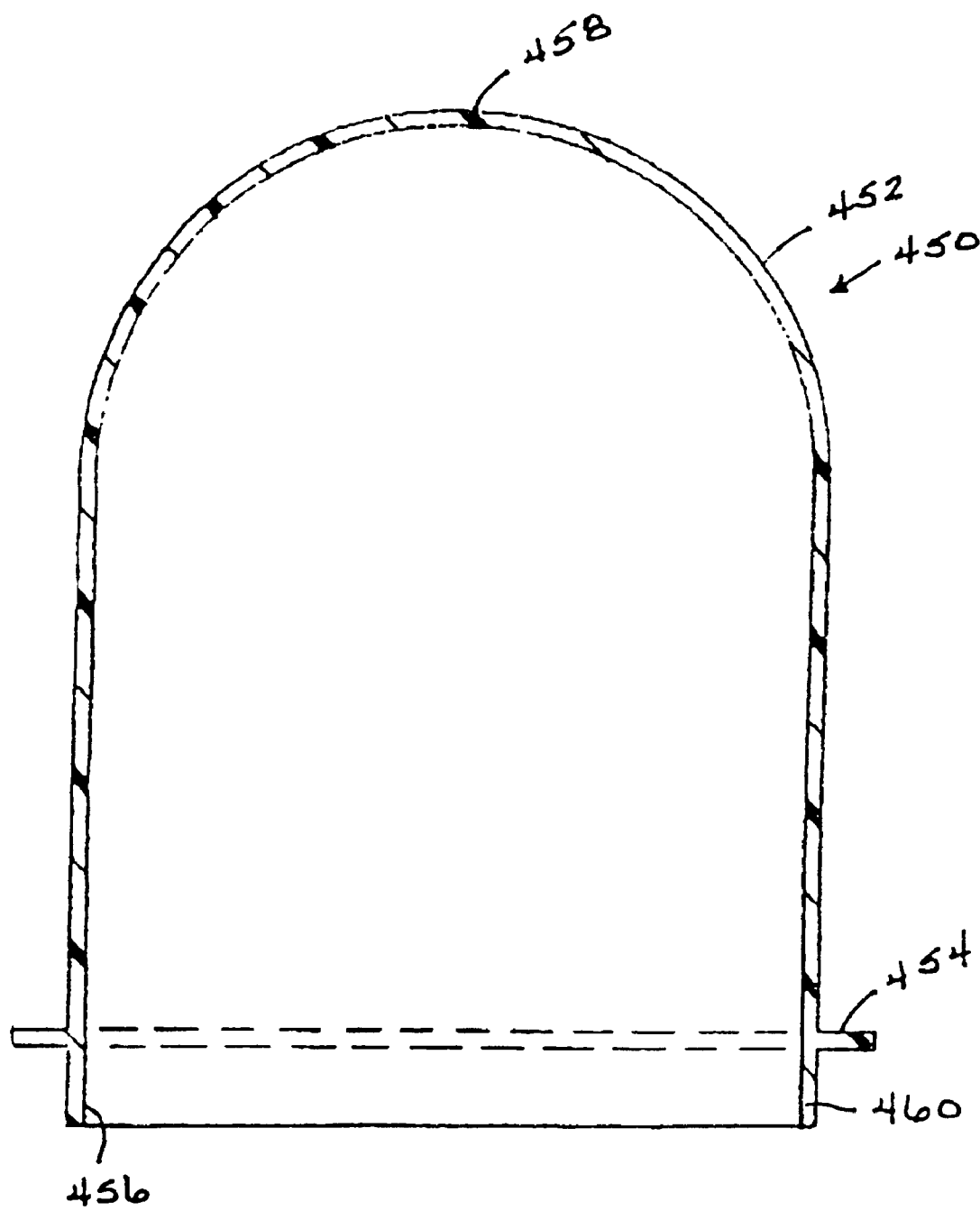
FIG. 21 is a cross-sectional view of the frost dome of FIG. 20.
Figure 22:
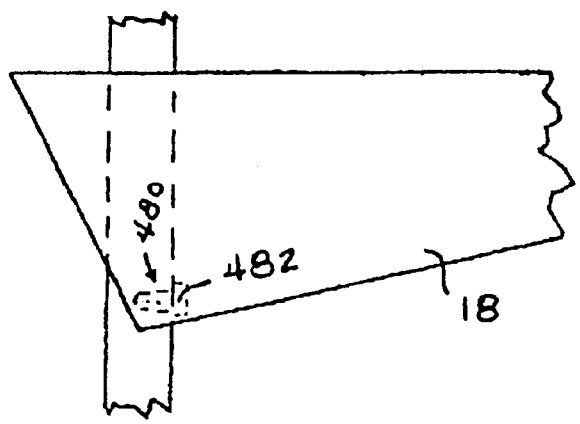
FIG. 22 is a side view of the plant support of FIG. 1 further including a support pin shown in phantom.
Figure 30:
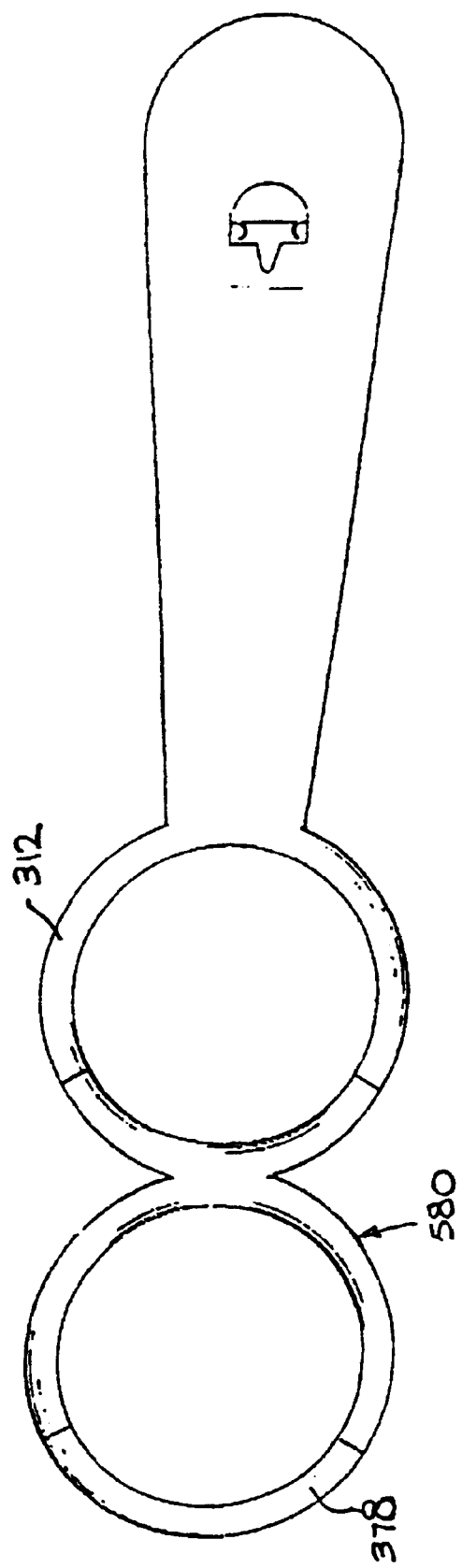
FIG. 30 is a perspective view of the plant support of FIG. 18 further including an extension ring positioned between the support ring and the removable arc.
Figure 31:
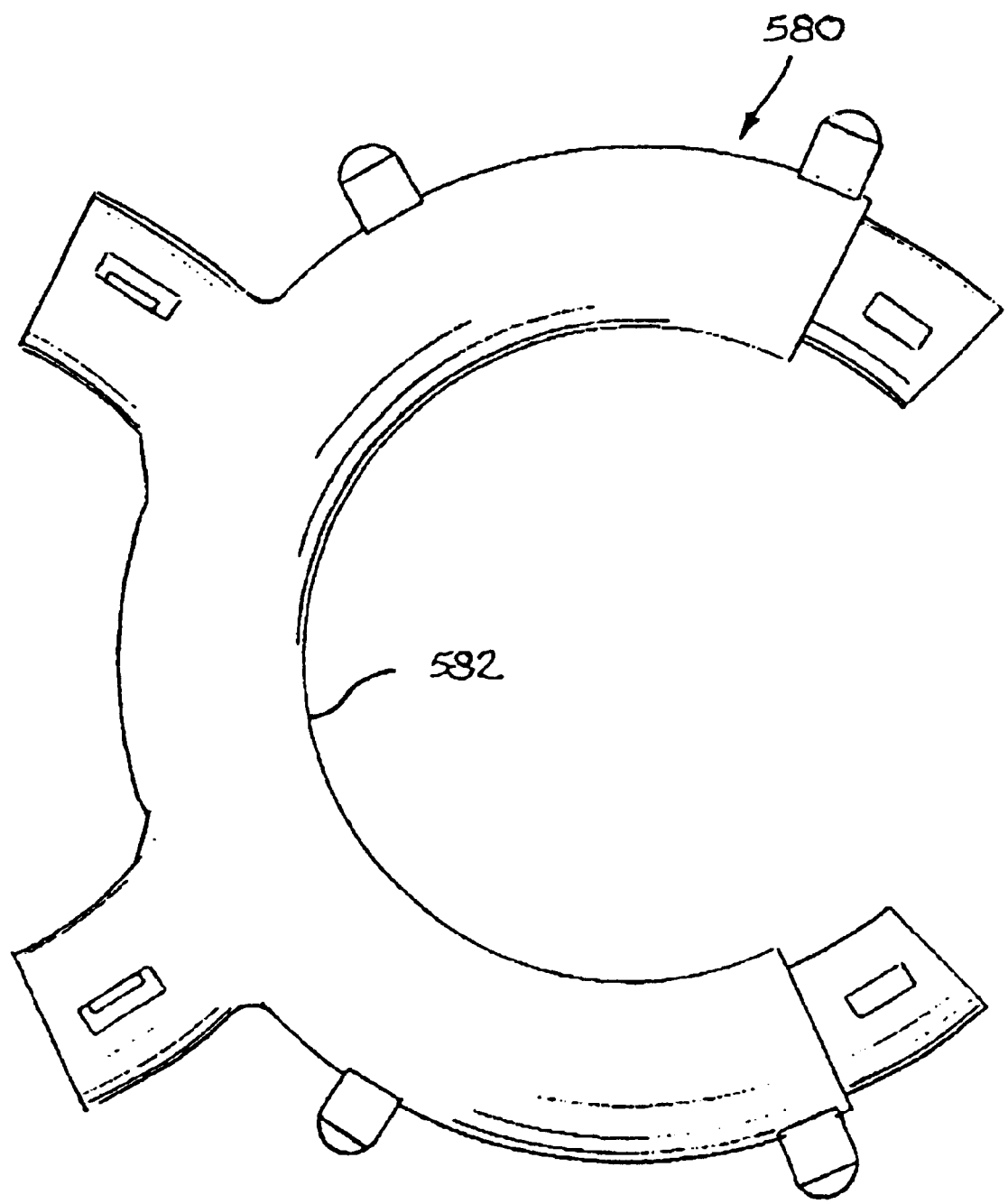
FIG. 31 is a top view of the extension ring of FIG. 30.
Figure 32:
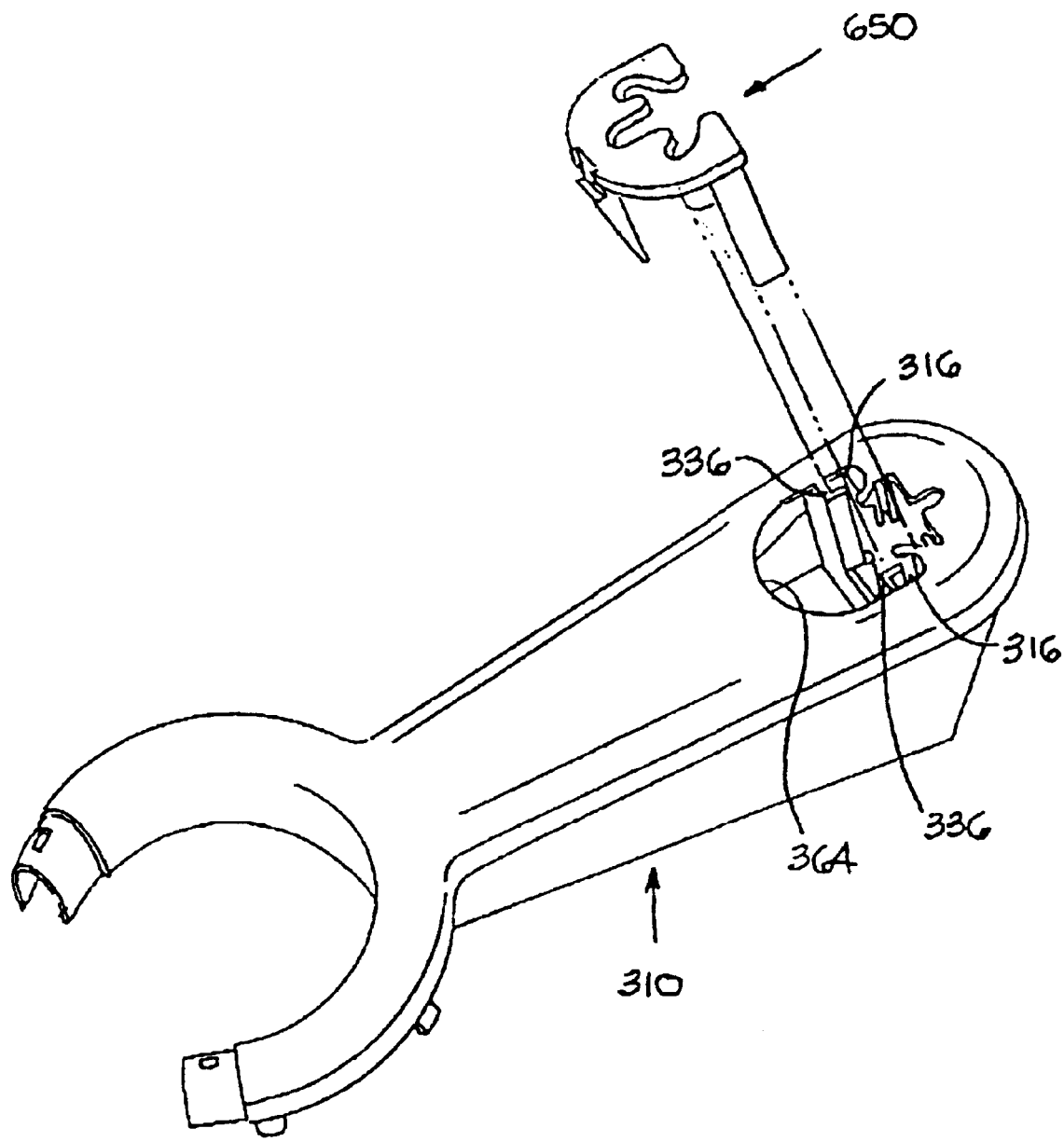
FIG. 32 is a perspective view of the plant support of FIG. 18 further including a stabilizing wedge.

The ring 312 defines a cylindrical shape with a diameter "ds" of preferably from about three to about twenty inches, and more preferably from about three to about eight inches. The ring 312 has an interior lip 324, which further defines a brace member 318, and an exterior lip 326. As shown in FIG. 18, the ring 312 can include a removable arc segment 370, such as described in U.S. Pat. No. 5,440,834, and incorporated herein by reference. The arc 370 includes a pair of hooks 372 that snap within slots 374 that are, cut in a pair of projections 376 attached to the spacer segment 380 of the ring 312. When the hooks 372 are snapped in the slots 374 the arc segment 370 completes the ring 312 and is held firmly to the remainder of the support 310. In the most preferred embodiment, the slots 374 include box-type frames on the underside of the The plant support 10 of FIGS. 1–8, and the alternative embodiments shown herein, can also be used with other accessories, such as a frost dome 450, as shown in FIGS. 20 and 21; a support pin 480, as shown in FIGS. 22 and 23; an extender 550, as shows in FIGS. 24–28; an extension ring 580, as shown in FIGS. 30–32; or a stabilizing wedge 650, as shown in FIGS. ??–??. The frost dome 450 is designed to fit on the plant support ring 10. The dome 450 has a crown 452 and a lip 454 that encircles the crown 452. The crown 452 has an opened end 456 and a sealed end 458, and can have a variety of shapes. For example, the crown 452 can have a semispherical shape, or it can be elongated so that a tall, thin plant can fit within the dome 450, or it may further include an indentation (not shown) that will allow it to more easily be aligned with the U-post 92 or T-post 96. The lip 454 encircles the crown 452 near the opened end 456, preferably leaving a sleeve 460. When the dome 450 is placed on the plant support 10, the sleeve 460 slides into the ring 12 essentially adjacent to the brace 18, and the lip 454 rests on the top of the ring 12, thereby preventing the dome 450 from slipping through the ring 12 completely. Ideally, the sleeve 460 fits snuggly within the ring 12 so that no further means are required for holding the dome 450 on the support 10. However, if the user desires, the dome can be more tightly secured to the support by attaching a rubber band or a string around the lip 454 and the ring 12, such as by looping the rubber band over the tabs 378 to secure them in place. Because the frost dome 450 fits directly on the plant support 10, the user can easily slip the dome 450 on the support 10 whenever frost is predicted thereby further protecting the plants.

As is well known, metal U-posts typically have a series of alternating keys and apertures along the longitudinal center of the post. The apertures can be used to allow the user to select a greater variety of heights for mounting the plant support 10 on the post, or for further stabilizing the plant support 10 on the U-post or T-post. To do this, a support pin 480 is used to mate the lower edge of the brace 18 to the post, as shown in FIG. 22. The brace 18 has been modified slightly on the post end 23 of the brace to include a notch (not shown) along the internal lip 24. ring 312 that positively engage the hooks 372, although the frame is not required for the hooks 372 to latch effectively in the slots 374. The inclusion of the removable arc segment 370 in the ring 312 allows the user to remove the support 310 from a plant without having to lift the ring 312 over the top of the plant. This is particularly advantageous when the support 310 is used for stabilizing small trees. When the tree reaches a sufficient size that the support 310 is no longer required, the arc 370 can be removed allowing the ring 312 to slip away from the tree trunk. Without the removable arc 370, the user would either have to leave the support 310 around the tree even though the tree no longer had a need for it (and could be harmed by the ring 312 if the trunk grew sufficiently thick), or the user would have to break the ring to remove the support from around the trunk.

The support 310 also includes small tabs 378 at predetermined positions along the periphery of the ring 312. The tabs 378 allow the user to attach twine or elastic supports across the ring 312 to divide the ring 312 into smaller segments, or to provide a non-rigid tension to hold the main trunk 98 of the plant or tree.

Figure 23A:
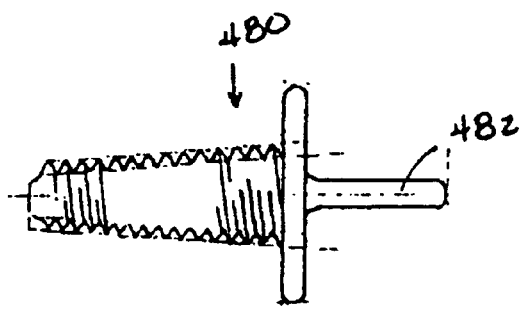
FIGS. 23A–23C are perspective views of different support pins which can be used to stabilize the plant support on the post.
Figure 23B:
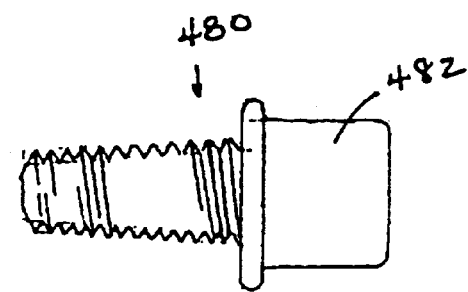
Figure 23C:
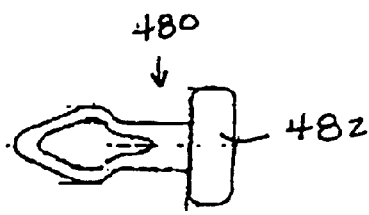

The ring support 310 also includes a spacer 360 which separates the ring 312 from the brim 314. The spacer 360 is an elongated segment which is preferably reinforced with ribs 362. In the preferred embodiment, the spacer 360 also includes a semi-circular aperture 364 adjacent to the latching section 316. The aperture 364 allows the support 310 to be tilted to a higher angle than could be achieved without the aperture 364, thereby making it easier to reposition the support 310 on the U-post 92 or T-post 96. The primary function of the spacer 360 is to allow the ring 312 to be positioned a slight distance away from the U-post 92 or T-post 96, while providing a space (the inside of the ring 312) within which the tree or plant can move freely. This combination of support with some freedom of movement promotes trunk form and taper and encourages taper and root strength in the young tree. The support pin 480 is mounted in an aperture in the post 92, 96, and the notch in the brace 18 is caught by the pin head 482. The support pin 480 can have a variety of designs, such as shown in FIGS. 23A–23C, and should be made of a relatively inelastic material so that it can sustain being pushed into or pulled from the apertures with a moderate amount of force.

Figure 26:
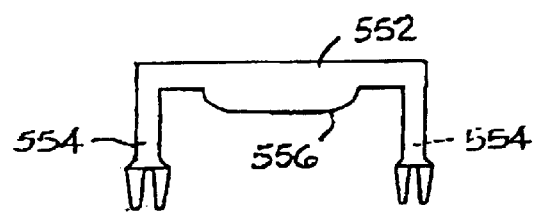
FIG. 26 is a front view of an extender of FIG. 24.
Figure 24:
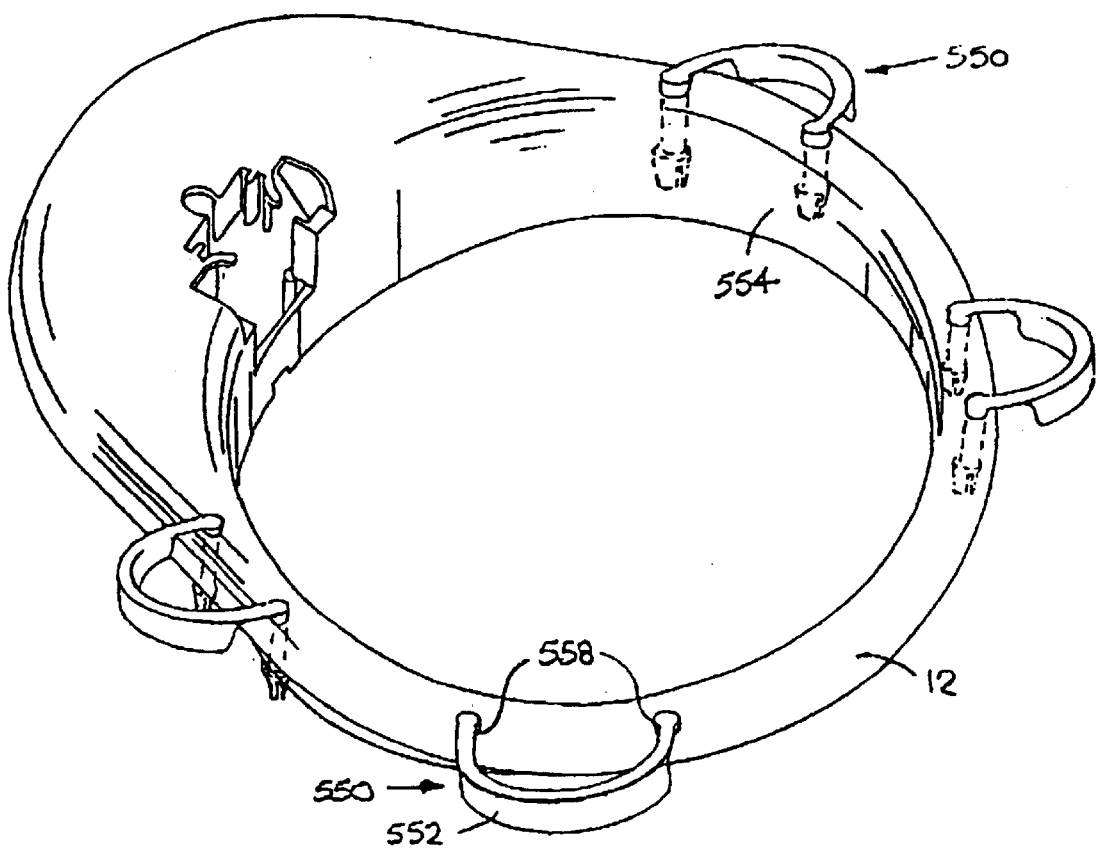
FIG. 24 is a perspective view of the plant support of FIG. 1 further including a plurality of extenders.
Figure 27:
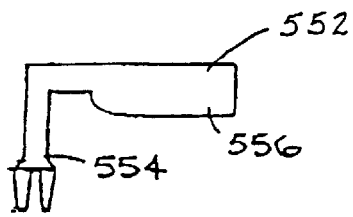
FIG. 27 is a side view of an extender of FIG. 24.
Figure 25:
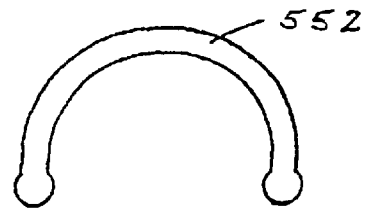
FIG. 25 is a top view of an extender of FIG. 24.
Figure 28:
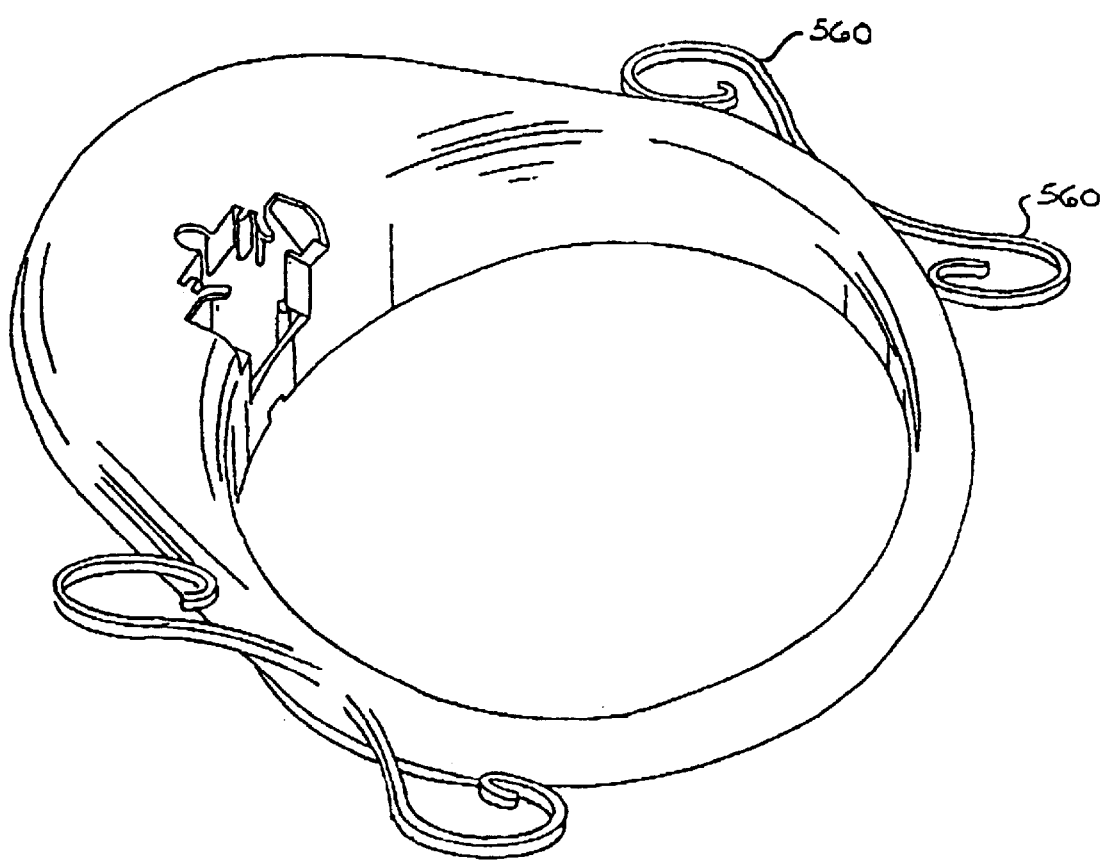
FIG. 28 is a perspective view of an alternative embodiment of the plant support of FIG. 1 further including a plurality of extenders molded as a single unit with the support.

The user may desire to support new sprouts that appear on a plant after the plant has grown to a size which fits comfortably within the ring. To support these sprouts the user may attach an optional extender 550 onto the ring 12, as shown in FIG. 24. As shown in FIGS. 25–27, the extender 550 includes a back 552 to support the sprout and legs 554 to attach the extender 550 to the ring 12. The back 552 may include a thickened region 556 to provide more even plant support, but this is not required. The extender 550 is secured to the ring 12 by the legs 554 projecting through apertures 58 in the ring 12. An alternative embodiment of the extender 560 is shown in FIG. 28. In this embodiment, the extender 560 appears to be a decorative feature of the plant support, but the sprouts can be supported within the extender 560.

Figure 29:
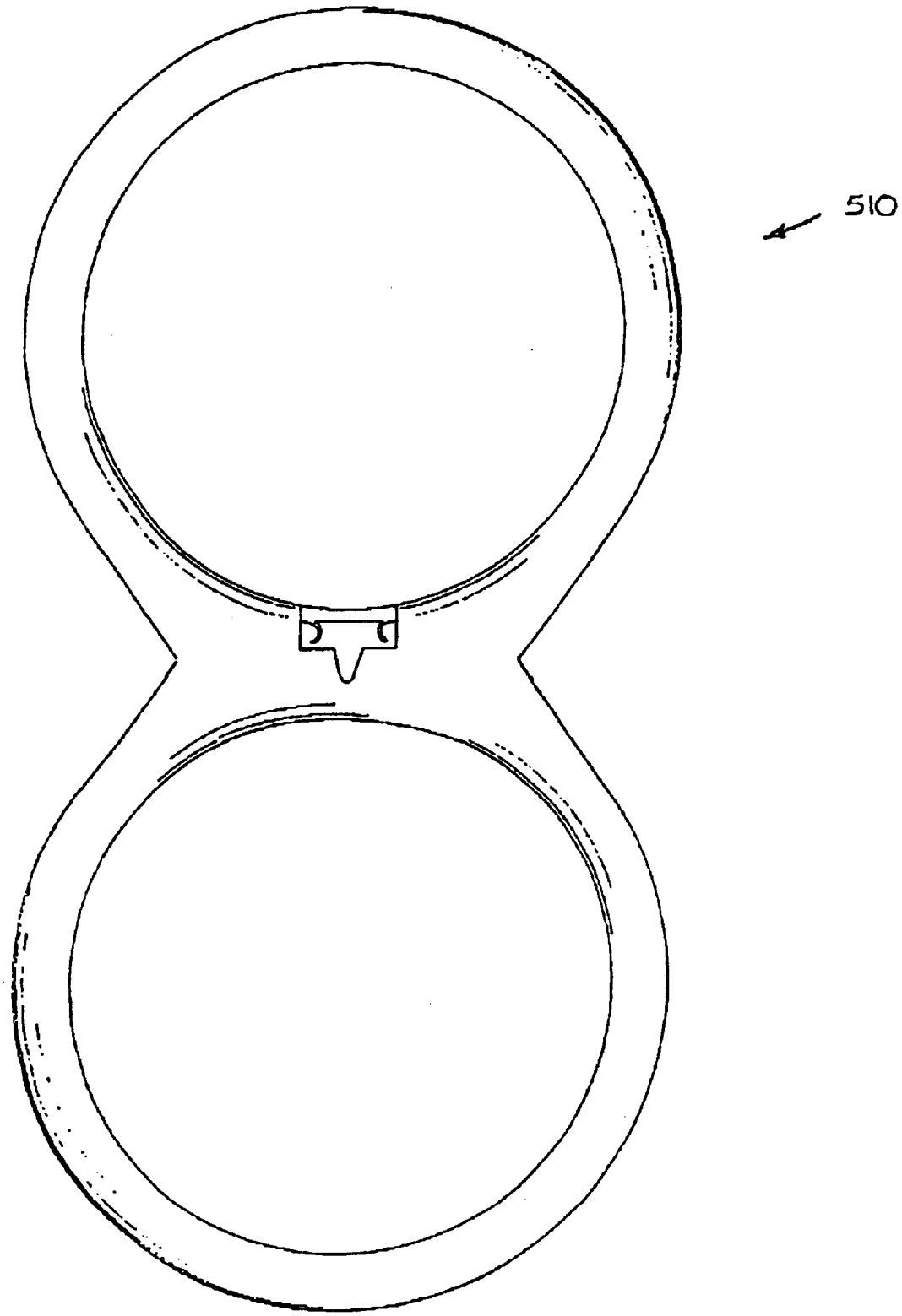
FIG. 29 is an alternative embodiment of the plant support of FIG. 1 wherein the support has a "figure 8" shape.

The user may wish to support plants that have more than one trunk. For this purpose, it would be advantageous to have more than one support ring 12. As noted previously, the plant support can have a variety of shapes. For example, a "FIG. 8" shaped support 510 is shown in FIG. 29. Alternatively, as shown in FIG. 30, an extension ring 580 may be added to support 10 between the ring 312 and the removable arc segment 378. As shown in FIG. 31, the extension ring 580 is similar to the removable arc 378 but extends into a "C" shape at one end 582, similar to the ring 312. Also similar to the ring 312, the extension ring is sized such that the removable arc 378 can be attached to the extension 580 to form a complete ring.

Figure 33:
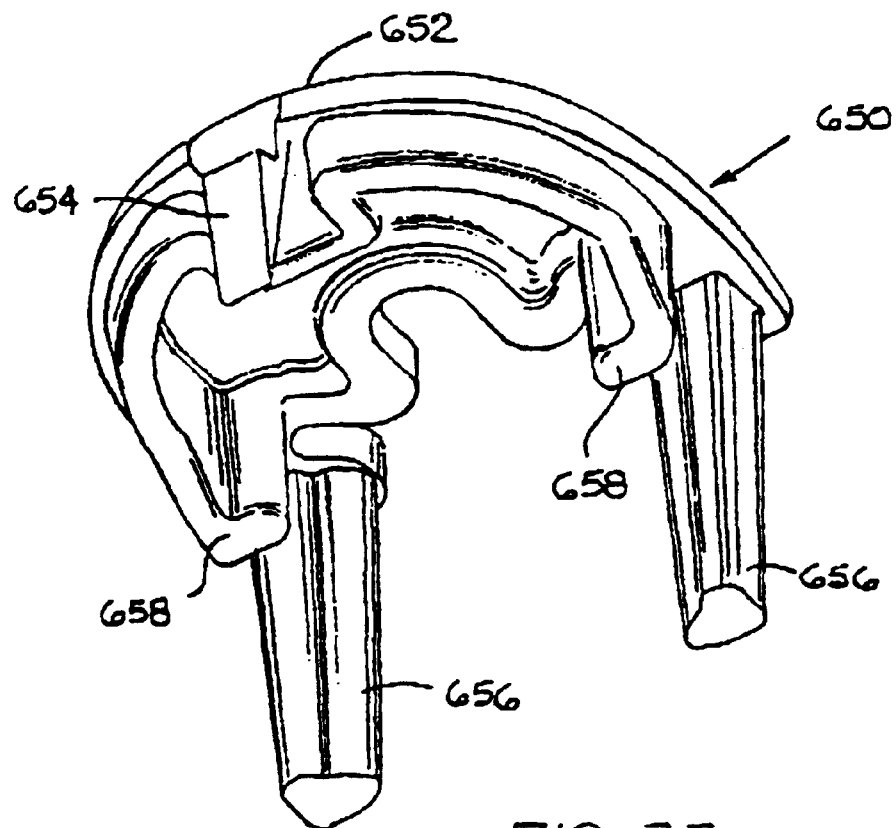
FIG. 33 is a bottom perspective view of the stabilizing wedge of FIG. 32.
Figure 34:
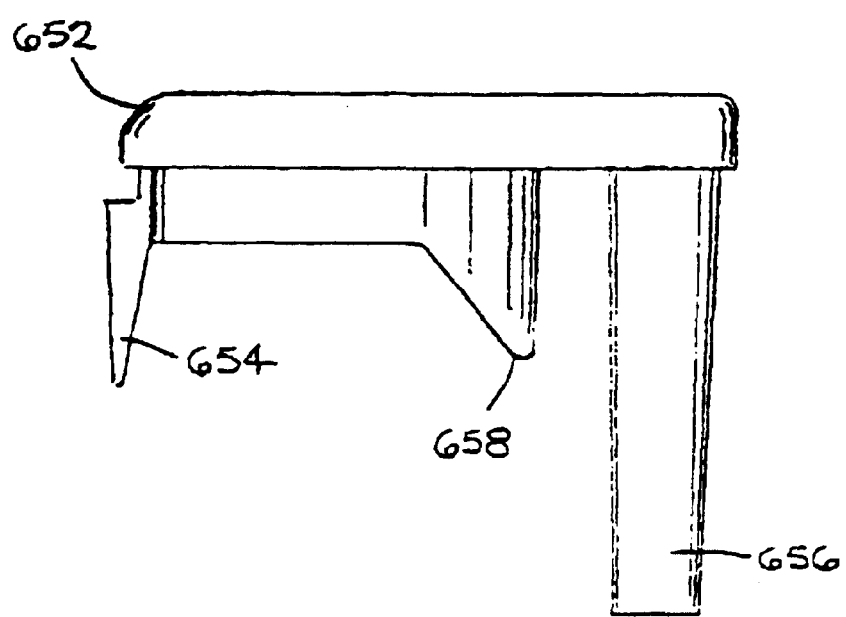
FIG. 34 is a side view of the stabilizing wedge of FIG. 32.

On occasion, the user may find it helpful to further stabilize the support ring on the post 96. For example, if the support ring 310 is used to support a small tree, the user may wish to have the ring 310 "locked" onto the post 96. This can be accomplished by adding a stabilizing wedge 650 to the aperture 364, as shown in FIGS. 32–34. The stabilizing wedge 650 has a rounded back 652 with a locking clip 654, a pair of stabilizing legs 656, and a pair of stabilizing posts 658. The stabilizing legs 656 are sized and shaped to fit within the cavities 316. When the legs 656 are properly positioned, the wedge can slip into the aperture 364 such that the locking clip 654 can be engaged by the support and the stabilizing posts 658 rest adjacent to the ring edge 336. The wedge 650 can be easily removed from the ring 310 by releasing the clip 654 and sliding the wedge 650 upward.

Other and different support rings may utilize the inventive features described herein as well. It will be obvious to those skilled in the art that modifications may be made to the embodiments described above without departing from the scope of the present invention.

What is claimed is:

1. A plant support device (10) for use with an upright post (92 or 96), having at least two spaced edges, said device comprising:
   (a) at least one ring member (12), which defines an essentially vertical brace member (18), said brace member (18) having a protruding end (25) and a post end (23);
   (b) an essentially horizontal brim (14) extending from said post end (23) of said brace (18), said brim (14) including an aperture (30), having a ring edge (36) and a rear edge (39), through which said post can protrude thereby allowing said post to be encircled by said plant support device;
   (c) at least one pair of semi-rigid brackets (32R, 32L) projecting from the ring edge (36) of said aperture (30) into said aperture, said brackets (32R, 32L) being positioned so as to positively engage the spaced edges of said post; and
   (d) at least one pair of essentially vertical rear walls (34R, 34L) extending downwardly from the rear edge (39) of said aperture (30) so as to be essentially parallel with said brace (18), said rear walls (34R, 34L) preventing said support device from pivoting relative to said post.

2. The plant support device of claim 1 wherein said ring member includes a removable arc segment (370).

3. The plant support device of claim 1 wherein said brace member has a circular cross-section.

4. The plant support device of claim 3 wherein said brace member has an internal diameter of from about three inches to about twenty inches.

5. The plant support device of claim 1 wherein said brace member is tapered so as to have a longer length at the post end than at the protruding end.

6. The plant support device of claim 1 further including a second pair of brackets (133R, 133L) projecting from the rear wall (134R, 134L) into said aperture, said brackets (133R, 133L) being positioned so as to positively engage the spaced edges of said post.

7. The plant support device of claim 1 further including a plurality of tabs (378) projecting downwardly from said ring, said tabs facilitating the attachment of elastic support bands.

8. The plant support device of claim 1 wherein said brim (314) is elongated so as to form a spacer (360) between said brace and said aperture.

9. The plant support device of claim 8 further including at least one rib (362) to reinforce the spacer (360).

10. The plant support device of claim 1 further including a dome (458), encircled by a flange (454), that can be reversibly affixed to said ring member to protect a plant from inclement weather.

11. The plant support device of claim 1 further including an extension ring (580), that can be reversibly affixed to said ring member to provide an additional ring member for said support.

12. The plant support device of claim 1 further including a wedge (650), that can be reversibly affixed to said ring edge to stabilize movement of said support on said upright post.

13. A plant support device (10) for use with an upright post, having at least two spaced edges, said device comprising:
   (a) at least one ring member (12), which defines an essentially vertical brace member (18), said brace member (18) having a protruding end (25) and a post end (23);
   (b) an essentially horizontal brim (14) extending from said post end (23) of said brace (18), said brim (18) including an aperture (30), having a ring edge (236), a pair of first rear edges (238R, 238L), a pair of second rear edges (240R, 240L), and at least one pair of side edges (237R, 237L), through which said post can protrude thereby allowing said post to be encircled by said plant support device;
   (c) at least one pair of semi-rigid brackets (250R, 250L) projecting from the ring edge (236) of said aperture (230) into said aperture (230), said brackets (250R, 250L) being positioned so as to align the upright post within the aperture;
   (d) at least one pair of vertical stops (254R, 254L) projecting from the pair of first rear edges (238R, 238L) into said aperture (230), said stops (254R, 254L) terminating in a thumb-like projection directed toward the ring edge, and positioned so as to positively engage the spaced edges of said post; and
   (e) at least one pair of essentially vertical rear walls (258R, 258L) extending downwardly from the pair of second rear edges (240R, 240L) so as to be essentially parallel with said brace (18), said rear walls preventing said support device from pivoting relative to said post.

14. The plant support device of claim 13 further including a pair of side walls extending downwardly from the pair of side edges, said side walls further including a second pair of brackets projecting from the side walls into said aperture, said brackets being positioned so as to positively engage the spaced edges of said post.

15. The plant support device of claim 13 wherein said ring member includes a removable arc segment (370).

16. The plant support device of claim 13 wherein said brace member has a circular cross-section.

17. The plant support device of claim 16 wherein said brace member has an internal diameter of from about three inches to about twenty inches.

18. The plant support device of claim 13 wherein said brace member is tapered so as to have a longer length at the post end than at the protruding end.

19. The plant support device of claim 13 further including a plurality of tabs (378) projecting downwardly from said ring, said tabs facilitating the attachment of elastic support bands.

20. The plant support device of claim 13 wherein said brim is elongated so as to form a spacer (360) between said brace and said aperture.

21. The plant support device of claim 20 further including at least one rib (362) to reinforce the spacer (360).

22. The plant support device of claim 13 further including a dome (458), encircled by a flange (454), that can be reversibly affixed to said ring member to protect a plant from inclement weather.

23. A method of supporting a plant with an upright post which is securely mounted in ground comprising:
   (a) encircling said plant within a ring member, which defines an essentially vertical brace member, said brace member having a protruding end and a post end;
   (b) securing said ring member to an essentially horizontal and elongated brim extending from said post end of said brace, said brim including at least one aperture, having a ring edge, a pair of side edges, and a rear edge, through which an upright post can protrude, said brim further including at least one pair of semi-rigid brackets projecting from the ring edge of said aperture into said aperture, said brackets being positioned so as to positively engage the spaced edges of said post, and at least one pair of essentially vertical rear walls extending downwardly from the rear edge of said aperture so as to be essentially parallel with said brace; and
   (c) passing said brim over said upright post such that the post projects through said aperture, and such that said brackets positively engage the spaced edges of said post, and such that the brim is prevented from pivoting relative to said post.

* * * * *